United States Patent
Baldwin et al.

(10) Patent No.: US 12,524,695 B2
(45) Date of Patent: Jan. 13, 2026

(54) QUANTUM GATE SET INCLUDING ARBITRARY ANGLE GATES AND/OR GLOBAL GATES

(71) Applicant: Quantinuum LLC, Broomfield, CO (US)

(72) Inventors: Charles Baldwin, Broomfield, CO (US); Daniel Stack, Broomfield, CO (US); John Gaebler, Broomfield, CO (US); Michael Feig, Broomfield, CO (US); Karl Mayer, Broomfield, CO (US)

(73) Assignee: Quantinuum LLC, Broomfield, CO (US)

( * ) Notice: Subject to any disclaimer, the term of this patent is extended or adjusted under 35 U.S.C. 154(b) by 711 days.

(21) Appl. No.: 17/937,590

(22) Filed: Oct. 3, 2022

(65) Prior Publication Data

US 2023/0125251 A1 Apr. 27, 2023

Related U.S. Application Data

(60) Provisional application No. 63/270,901, filed on Oct. 22, 2021.

(51) Int. Cl.
*G06N 10/40* (2022.01)
*G06F 15/78* (2006.01)

(52) U.S. Cl.
CPC ............ *G06N 10/40* (2022.01); *G06F 15/78* (2013.01)

(58) Field of Classification Search
CPC .................................................. G06N 10/40
USPC .......................................................... 706/62
See application file for complete search history.

(56) References Cited

U.S. PATENT DOCUMENTS

| | | |
|---|---|---|
| 11,037,776 B1 | 6/2021 | Makotyn et al. |
| 2020/0116623 A1* | 4/2020 | Cooper-Roy .......... G06N 10/70 |
| 2021/0182096 A1 | 6/2021 | Walker et al. |
| 2021/0272005 A1* | 9/2021 | King ...................... B82Y 10/00 |
| 2021/0272006 A1* | 9/2021 | King .......................... G06E 3/00 |
| 2021/0398009 A1* | 12/2021 | Vuletic ..................... G21K 1/06 |
| 2022/0156626 A1* | 5/2022 | Gorshkov .............. G06N 10/40 |
| 2024/0232673 A1 | 7/2024 | Gidney |

FOREIGN PATENT DOCUMENTS

| | | |
|---|---|---|
| JP | 2021-505982 A | 2/2021 |
| WO | 2021/007560 A1 | 1/2021 |

(Continued)

OTHER PUBLICATIONS

Baldwin, C. H., et al, "Subspace benchmarking high-fidelity entangling operations with trapped ions", Physical Review Research, dated Mar. 19, 2020, retrieved from the Internet at https://arxiv.org/abs/1911.00085v3, 16 pages.

(Continued)

*Primary Examiner* — Ruay Ho
(74) *Attorney, Agent, or Firm* — Alston & Bird LLP

(57) ABSTRACT

A controller of a QCCD-based quantum computer is configured to perform arbitrary angle two-qubit gates using global single-qubit gates and rotations of arbitrary angles and/or individual single-qubit gates that include two-qubit gate primitives, such as a phase-independent anti-symmetric two-qubit gate, and that are not individually addressed.

20 Claims, 9 Drawing Sheets

(56) References Cited

FOREIGN PATENT DOCUMENTS

WO      2021/025762 A1     2/2021
WO      WO-2023010164 A1 *    2/2023   ............. G06N 10/20

OTHER PUBLICATIONS

Lee, P. J., et al., "Phase control of trapped ion quantum gates", Journal of Optics B: Quantum and Semiclassical Optics, Sep. 21, 2005, pp. S371-S383, vol. 7, No. 10, Institute of Physics Publishing, Great Britain.

Outgoing—ISA/210—International Search Report Mailed on Feb. 9, 2023 for WO Application No. PCT/US22/047417, 2 page(s).

Outgoing Written Opinion of the ISA Mailed on Feb. 9, 2023 for WO Application No. PCT/US22/047417, 8 page(s).

Pino, J. M., et al., "Demonstration of the trapped-ion quantum CCD computer architecture", Nature, dated Apr. 9, 2021, retrieved from the Internet at https://arxiv.org/pdf/2003.01293.pdf, 11 pages.

Sorensen, A., et al., "Entanglement and quantum computation with ions in thermal motion"; Physical Review A, Jul. 18, 2000, pp. 022311-1 thru 022311-11, vol. 62, The American Physical Society, USA.

U.S. Provisional Patent Application for "Apparatuses, Systems, and Methods for Elliptical Atomic Object Traps", Unpublished (filing date Dec. 17, 2020), (David Hayes, Inventor), (Quantinuum LLC, Assignee), 63199279.

U.S. Provisional Patent Application for "Periodic Multi-Dimensional Atomic Object Confinement Apparatus Having Curved Legs", Unpublished (filing date Aug. 19, 2021), (Christopher Langer, Inventor), (Quantinuum LLC, Assignee), 63235007.

English translation of JP Decision to Grant dated Feb. 12, 2025 for JP Application No. 2024523754, 2 page(s).

JP Decision to Grant Mailed on Feb. 12, 2025 for JP Application No. 2024523754, 3 page(s).

Lee, P. J., et al., "Phase Control of Trapped Ion Quantum Gates", Journal of Optics B: Quantum and Semiclassical Optics, submitted May 27, 2005 to the Cornell University Library Online Archive, available on the Internet at https://arxiv.org/pdf/quant-ph/0505203, 30 pages.

* cited by examiner

QUANTUM GATE SET INCLUDING ARBITRARY ANGLE GATES AND/OR GLOBAL GATES

CROSS-REFERENCE TO RELATED APPLICATIONS

This application claims priority to U.S. Application No. 63/270,901, filed Oct. 22, 2021, the content of which is incorporated herein by reference in its entirety.

TECHNICAL FIELD

Various embodiments relate to performing quantum gates on qubits of a quantum computer. For example, various embodiments relate to performing arbitrary angle gates and/or global gates on qubits of a quantum computer. For example, various embodiments relate to quantum computer configured to perform arbitrary angle gates and/or global gates on qubits.

BACKGROUND

Quantum charge-coupled devices (QCCD) architecture is one type of architecture that can be used for large-scale quantum computation. According to QCCD architecture, a plurality of atomic objects are confined by an atomic object confinement apparatus and controlled evolution of the quantum state of the atomic objects is used to perform quantum computations. The controlled evolution of the quantum state of the atomic objects is accomplished through the performance of various single-qubit gates and multiple-qubit gates (e.g., two-qubit gates) in accordance with a quantum circuit. A gate set is considered universal when the gate primitives of the gate set can be used to construct any gate.

The performance of the single-qubit gates requires that the atomic object having the gate performed thereon be physically isolated from its neighboring atomic objects. This requires transporting the atomic objects, which is a relatively slow process (compared to the performance of gates) and causes the atomic object to be heated. To account for the heating, a cooling operation is performed on the atomic object, which is an even slower process. Through applied effort, ingenuity, and innovation many deficiencies of such prior atomic object confinement apparatuses and systems incorporating such atomic object confinement apparatuses, and gate sets for use thereby, therefore have been solved by developing solutions that are structured in accordance with the embodiments of the present invention, many examples of which are described in detail herein.

BRIEF SUMMARY OF EXAMPLE EMBODIMENTS

Example embodiments relate to the performance of quantum gates on qubits of a quantum computer. Various embodiments relate to the performance of quantum gates on qubits of a QCCD-based quantum processor. Various embodiments provide an arbitrary two-qubit gate, referred to herein as a general two-qubit gate. Various embodiments provide general two-qubit gates, quantum computer controllers configured to cause performance of general two-qubit gates (or general multiple-qubit gates or general single-qubit gates), and/or quantum processors and/or computers configured for performing general two-qubit gates (or general multiple-qubit gates or general single-qubit gates). Various embodiments provide single-qubit gates that are performed, at least in part, via the performance of two-qubit gate primitives.

According to a first aspect, a method for performing a general two-qubit gate using a QCCD-based quantum processor is provided. In an example embodiment, the method comprises providing a first atomic object and a second atomic object, the second atomic object physically located proximate the first atomic object; causing, by a controller configured to control various operations of the QCCD-based quantum processor, performance of a first frame rotation of the first atomic object and the first frame rotation of the second atomic object; causing, by the controller, performance of a first phase-independent two-qubit gate corresponding to a rotation of a first arbitrary angle on the first atomic object and the second atomic object; causing, by the controller, performance of a second frame rotation of the first atomic object and the second frame rotation of the second atomic object; causing, by the controller, performance of a second arbitrary angle phase-independent two-qubit gate corresponding to a rotation of a second arbitrary angle to the first atomic object and the second atomic object; causing, by the controller, performance of a third frame rotation of the first atomic object and the third frame rotation of the second atomic object; and causing, by the controller, performance of a third phase-independent two-qubit gate corresponding to a third arbitrary angle to the first atomic object and the second atomic object.

In an example embodiment, each of the second frame rotation and third frame rotation comprise a respective one or more global single-qubit gates, each global single qubit gate acts the same on the first atomic object and the second atomic object.

In an example embodiment, the second frame rotation and the third frame rotation are each performed by a respective pair of single-qubit gate manipulation signals being incident on both the first atomic object and the second atomic object.

In an example embodiment, the pair of single-qubit gate manipulation signals comprises a first manipulation signal and a second manipulation signal, the first manipulation signal and the second manipulation signal (a) co-propagate and (b) have a frequency difference corresponding to an energy difference between a first state of a qubit space and a second state of the qubit space.

In an example embodiment, the first, second, and third phase-independent two-qubit gates are each performed by a respective pair of two-qubit gate manipulation signals being incident on both the first atomic object and the second atomic object.

In an example embodiment, the pair of two-qubit gate manipulation signals comprises a third manipulation signal and a fourth manipulation signal, the third manipulation signal and the fourth manipulation signal (a) propagate at a relative angle of 90 degrees, (b) are linearly polarized, and (c) are linearly polarized in perpendicular directions.

In an example embodiment, at least one characteristic of at least one of the third manipulation signal or the fourth manipulation signal is controlled based on a functional representation of a manipulation signal characteristic as a function of an input signal to a modulator configured to condition a respective one of the third manipulation signal or the fourth manipulation signal, wherein the at last one characteristic is at least one of a power level, a frequency, or a duration.

In an example embodiment, a phase of at least one of (a) the first atomic object or (b) the second atomic object is physically updated prior to performance of the first frame rotation.

In an example embodiment, a cooling step is performed prior to performing the first phase-independent two-qubit gate.

In an example embodiment, after performing the cooling step prior to performing the first phase-independent two-qubit gate, no further cooling is performed on the first atomic object and the second atomic object until after performance of the third phase-independent two-qubit gate.

According to another aspect, a quantum computer is provided. In an example embodiment, the quantum computer comprises an atomic object confinement apparatus configured to confining two or more atomic objects; one or more manipulation sources; and a controller. The controller is configured to control the one or more manipulation sources and the atomic object confinement apparatus to cause the one or more manipulation sources to generate and provide two or more pairs of manipulation signals such that the two or more pairs of manipulation signals are each incident on the two or more atomic objects, wherein at least one of the two or more pairs of manipulation signals is configured to cause performance of an anti-symmetric two-qubit gate on the two atomic objects and wherein a combined effect of the two or more pairs of manipulation signals being incident on the two or more atomic objects is performance of an individual single-qubit gate.

In an example embodiment, the two atomic objects comprise a first atomic object and a second atomic object and wherein the first atomic object and the second atomic object are separated by a separation distance corresponding to a selected phase difference of at least one of the manipulation signals.

In an example embodiment, the individual single-qubit gate is an arbitrary angle single-qubit gate.

In an example embodiment, the controller is further configured to track respective AC stark shifts imparted to each of the two atomic objects as a result of the two or more pairs of manipulations signals being incident on the two atomic objects.

In an example embodiment, the generated individual single qubit gate is part of a controllable gate set that does not require qubit addressing.

According to another aspect, a quantum computer configured to perform a general gate is provided. The quantum computer comprises an atomic object confinement apparatus configured to confine two or more atomic objects; one or more manipulation sources; and a controller configured to control the one or more manipulation sources and the atomic object confinement apparatus. In an example embodiment, the controller is configured to control the one or more manipulation sources and the atomic object confinement apparatus to cause a first atomic object to be confined at a first location and a second atomic object to be confined at a second location, the first location being proximate the second location; cause a first frame rotation pair of manipulation signals to be incident on the first atomic object and the second atomic object to cause performance of a first frame rotation of the first atomic object and the first frame rotation of the second atomic object; cause a first two-qubit gate pair of manipulation signals to be incident on the first atomic object and the second atomic object to cause performance of a first phase-independent two-qubit gate corresponding to a rotation of a first arbitrary angle on the first atomic object and the second atomic object; cause a second frame rotation pair of manipulation signals to be incident on the first atomic object and the second atomic object to cause performance of a second frame rotation of the first atomic object and the second frame rotation of the second atomic object; cause a second two-qubit gate pair of manipulation signals to be incident on the first atomic object and the second atomic object to cause performance of a second phase-independent two-qubit gate corresponding to a rotation of a second arbitrary angle to the first atomic object and the second atomic object; cause a third frame rotation pair of manipulation signals to be incident on the first atomic object and the second atomic object to cause performance of a third frame rotation of the first atomic object and the third frame rotation of the second atomic object; and cause a third two-qubit gate pair of manipulation signals to be incident on the first atomic object and the second atomic object to cause performance of a third phase-independent two-qubit gate corresponding to a rotation of a third arbitrary angle to the first atomic object and the second atomic object.

In an example embodiment, the first atomic object and the second atomic object are respective qubits of the quantum computer.

In an example embodiment, the controller is further configured to determine at least one characteristic of at least one manipulation signal of at least one of the first two-qubit gate pair, second two-qubit gate pair, or third two-qubit gate pair based on a functional representation of a manipulation signal characteristic as a function of an input signal to a modulator configured to condition that at least one manipulation signal, wherein the at least one characteristic is at least one of a power level, a frequency, or a duration.

In an example embodiment, the controller is further configured to control the atomic object confinement apparatus to maintain the first atomic object at the first location and maintain the second atomic object at the second location at least for a time period beginning when the first two-qubit gate pair of manipulation signals is incident on the first atomic object and the second atomic object and ending when the third two-qubit gate pair of manipulation signals is incident on the first atomic object and the second atomic object.

In an example embodiment, the general gate is a general two-qubit gate.

In an example embodiment, the general gate is a general single-qubit gate.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 10:
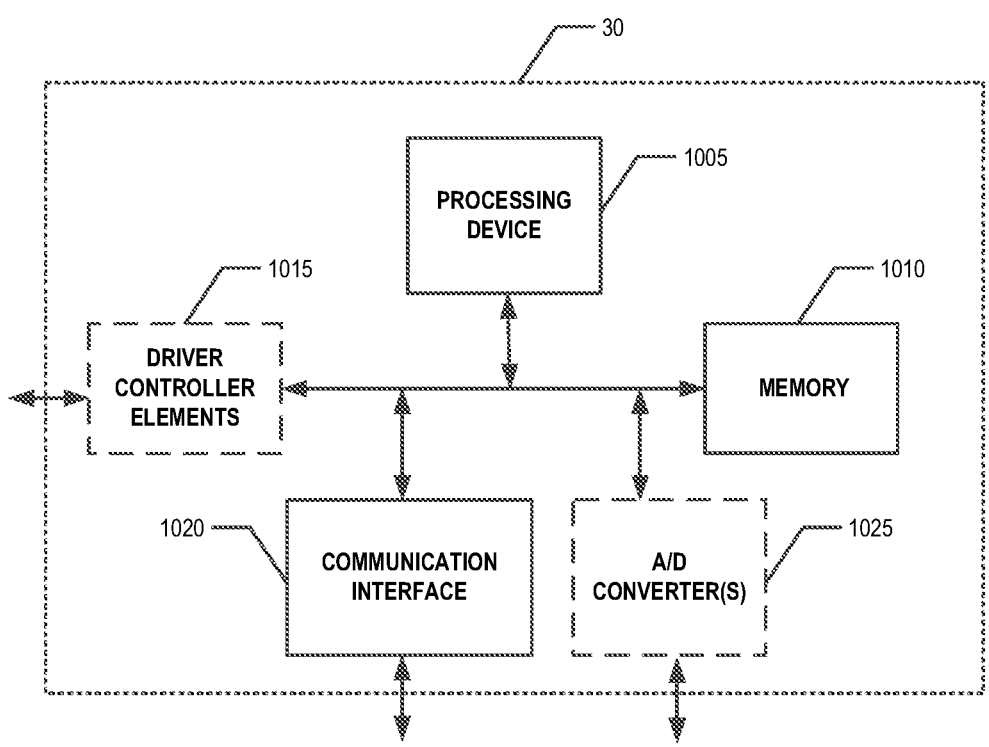
Figure 11:
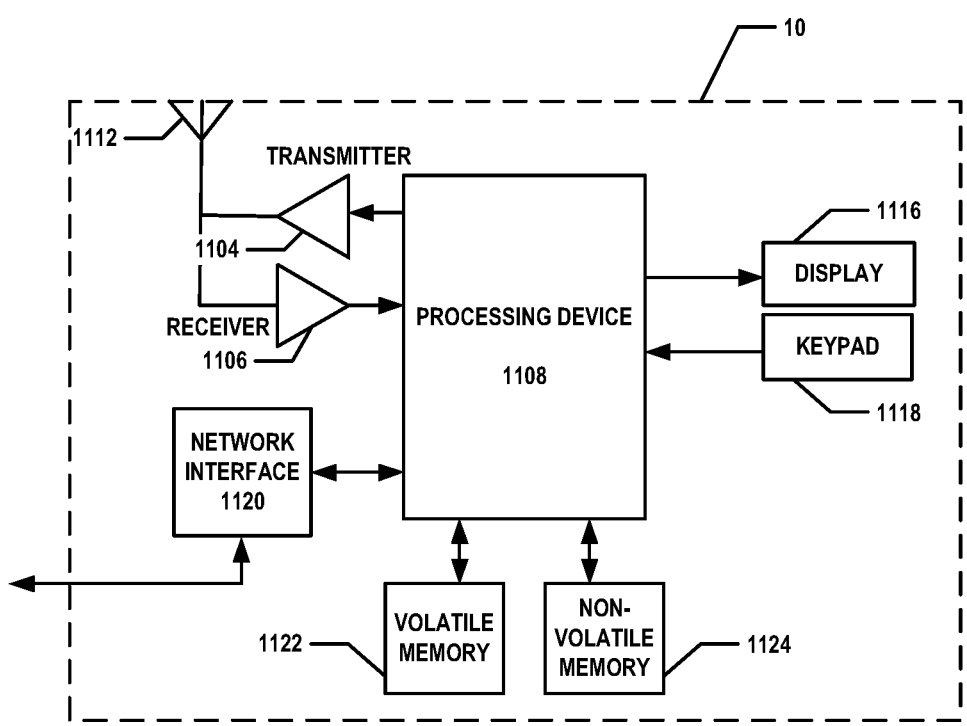

FIG. 10 provides a schematic diagram of an example controller of a quantum computer, according to various embodiments; and FIG. 11 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits/tolerances and/or within user measurement capabilities, unless otherwise indicated. Like numbers refer to like elements throughout.

I. DEFINITIONS

Various embodiments relate to a QCCD-based quantum processor and/or a quantum computer comprising a QCCD-based quantum processor. In general, a QCCD-based quantum processor includes an atomic object confinement apparatus configured to confine atomic objects therein. At least some of the atomic objects are used as the qubits of the quantum processor. Controlled evolution of the quantum state of the atomic objects used as the qubits of the quantum processor enables the quantum processor to perform quantum calculations through the execution of quantum circuits and/or algorithms.

An atomic object confinement apparatus is a device or apparatus used to confine or trap atomic objects. In various embodiments, the atomic object confinement apparatus is manufactured and/or fabricated on a chip (e.g., having a silicon substrate and various electrical components and/or elements fabricated thereon). In various embodiments, the atomic object confinement apparatus is an ion trap (e.g., a surface ion trap, Paul trap, and/or the like).

In various embodiments, an atomic object is an ion; an atom; a neutral, polarized, or ionized molecule; a charged particle; and/or the like, or a group or crystal of ions, atoms, molecules, charged particles, and/or the like.

As is discussed in more detail elsewhere herein, an isolated qubit may be represented and/or modeled as a Bloch sphere with the current state of the qubit being a point on the Bloch sphere. The performance of a single-qubit gate on a qubit generally comprises one or more manipulation signals being incident on the atomic object which affect (e.g., caused controlled evolution of) the quantum state of qubit embodied by the atomic object. The performance of the gate causes the point on the Bloch sphere representing the current state of the qubit to move to a new and/or updated location. In general, performing a gate on a qubit amounts to a unitary operator acting on the current state of the qubit.

As the Bloch sphere is a sphere with a unit radius (a.k.a., a unit sphere), and the point representing the current state of the qubit remains on the surface of the unit sphere, the performance of the single-qubit gate can be represented and/or modeled as a rotation of a vector pointing from the center of the unit sphere to the point on the surface of unit sphere (referred to as the qubit vector herein). Conventional single-qubit gates correspond to set rotations of the qubit vector (e.g., a rotation of $\pi/2$). Example embodiments provide general single-qubit gates which correspond to rotations of the qubit vector through an arbitrary angle. The arbitrary angle may be selected on a per gate basis, for example, rather than being a set angle.

Various embodiments include the performance of a single-qubit gate on two-qubits that affects each of the qubits in the same manner. Such a gate is referred to herein as a global single-qubit. For example, a global single-qubit gate may be performed on two or more qubits and causes each of the two or more qubits to undergo the same rotation.

In various embodiments, frame rotation is performed on two qubits (e.g., a first qubit and a second qubit. A frame rotation is a rotation of the local frame of reference of the Bloch sphere representation of a qubit. In various embodiments, a frame rotation comprises one or more individual single-qubit gates. In various embodiments, a frame rotation may be an individually addressed single-qubit gate (referred to herein as an individually addressed frame rotation) or a global single-qubit gate (referred to herein as a global frame rotation).

Various embodiments include the performance two-qubit gates. A two-qubit gate is a gate that is enacted on two qubits and the effect of the gate (e.g., the rotation of the qubit vector caused by the gate) on at least one of the qubits one which the two-qubit gate is enacted is based on a state of another of the two qubits. In other words, a two-qubit gate causes an interaction and/or entanglement between the state of the two qubits.

In various embodiments, a gate set is defined that includes one or more global single-qubit gate primitives and one or more two-qubit gate primitives. As used herein, a gate primitive is an element of a defined gate set that may be used as a stand-alone gate (e.g., can be used itself as a gate) or may be used as a component or step in a gate. For example, performing a particular gate may include the performance of a plurality of gate primitives such that the collective or cumulative effect of the plurality of gate primitives amounts to the performance of the particular gate. For example, the gate primitives of a gate set are the building blocks out of which all of the available gates of the quantum processor can be generated.

Various embodiments relate to the performance of an individual single-qubit gate that are compiled from at least one two-qubit gate primitive. As used herein, an individual single-qubit gate is a gate that affects that state of only one qubit (beyond a possible phase shift). For example, the individual single-qubit gate may be generated through a combination of global single-qubit gate primitives and two-qubit gate primitives that are performed on two qubits. The result of performing the combination of the global single-qubit gate primitives and two-qubit gate primitives on the two qubits results in the state of one of the two qubits being updated and the state of the other of the two qubits not being updated beyond a possible change in phase (e.g., due to AC Stark shift and/or the like). For example, an individual single-qubit gate may have generally the same affect (up to a possible change in phase) as an individually addressed single-qubit gate, but without requiring individually addressing the target qubit.

Various embodiments provide global single-qubit gates and/or individual single-qubit gates that do not require qubit addressing. In particular, qubit addressing requires that a qubit be physically isolated and/or spaced apart from other qubits such that manipulations signals used to perform the addressed gate are generally only incident on the addressed qubit (in multi-dimensional atomic object confinement apparatus addressed single-qubit gates may be performed in parallel in different sections of the atomic object confinement apparatus using the same manipulation signal(s)).

In various embodiments, for a gate to be performed on two qubits, the two qubits must be located proximate one another. As used herein, the two qubits are proximate one another when a manipulation signal is incident on both of the two qubits. For example, the two qubits are located near enough to one another that they both fit inside the spot size of the manipulation signal(s) used to perform the gate.

Figure 2:
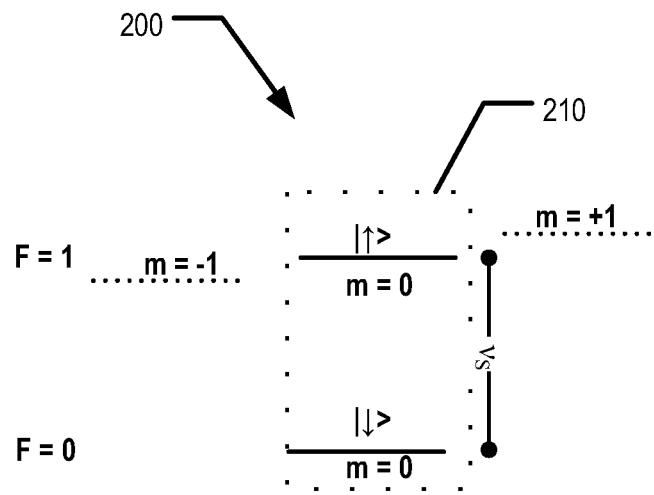
FIG. 2 illustrates a partial energy level diagram of a qubit space defined based on hyperfine splitting of an atomic object, in accordance with an example embodiment.

Various embodiments relate to the performance of phase-independent two-qubit gates. In general, a phase-independent gate is a gate where the corresponding unitary operator commutes with any rotation about the z-axis (defined as shown in FIG. 2).

Various embodiments relate to the performance of an anti-symmetric two-qubit gate. In general, an anti-symmetric two-qubit gate affects the two on which the gate is being performed in a non-symmetric of different manner. For example, performance of the anti-symmetric two-qubit gate on the two qubits causes a first qubit vector representing the state of a first qubit of the two qubits to undergo a first rotation and causes a second qubit vector representing the state of a second qubit of the two qubits to undergo a second rotation, where the first rotation and the second rotation are not equal to one another.

II. EXAMPLE QUANTUM COMPUTER

Various embodiments provide an atomic object confinement apparatus, a quantum processor comprising an atomic object confinement apparatus, a quantum computer comprising an atomic object confinement apparatus, and/or the like and/or methods for use thereby. For example, the atomic object confinement apparatus may confine two or more atomic objects therein. The controlled evolution of the quantum state of one or more of the two or more atomic objects may then be performed (e.g., in accordance with a quantum circuit) using one or more general gates and/or global gates. For example, the atomic object(s) trapped and/or confined by the atomic object confinement apparatus and acted upon by the manipulation signals may be used as qubits of a quantum processor. For example, the quantum computer is configured to perform one or more general gates on two qubits thereof, in various embodiments. For example, the quantum computer is configured to perform one or more individual single-qubit gates generated using at least one two-qubit gate primitive.

Figure 1:
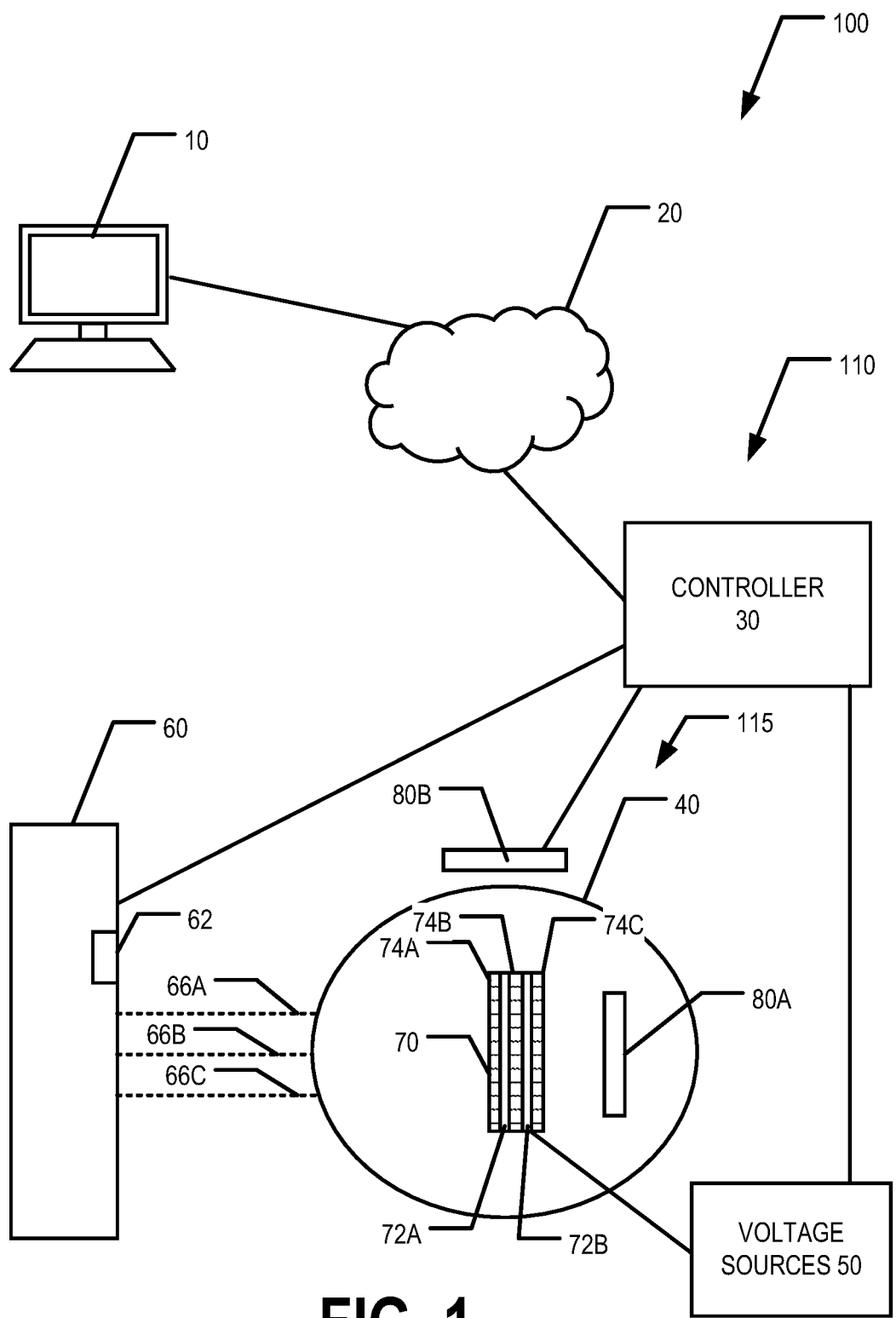
FIG. 1 is a schematic diagram illustrating an example quantum computing system, according to various embodiments.

FIG. 1 provides a schematic diagram of an example quantum computer system 100 comprising an atomic object confinement apparatus 70 (e.g., an ion trap, surface trap, Paul trap, and/or the like), in accordance with an example embodiment. In various embodiments, the quantum computer system 100 comprises a computing entity 10 and a quantum computer 110. In various embodiments, the quantum computer 110 comprises a controller 30 and a quantum processor 115. In various embodiments, the quantum processor 115 comprises an atomic object confinement apparatus 70 enclosed in a cryostat and/or vacuum chamber 40, one or more voltage sources 50, one or more manipulation sources 60, one or more magnetic field generators 80 (e.g., 80A, 80B), and/or the like.

In the illustrated embodiment, the atomic object confinement apparatus 70 comprises radio frequency (RF) rail electrodes 72 (e.g., 72A, 72B) and sequences of trapping and/or transport (TT) electrodes 74 (e.g., 74A, 74B, 74C). In various embodiments, the RF rail electrodes 72 and TT electrodes 74 define a one dimensional atomic object confinement apparatus or a two dimensional atomic object confinement apparatus. Some non-limiting example atomic object confinement apparatuses are described by U.S. Pat. No. 11,037,776, issued Jun. 15, 2021; U.S. Application No. 63/199,279, filed Dec. 17, 2020; and U.S. Application No. 63/235,007, filed Aug. 19, 2021, the contents of which are incorporated by reference in their entireties herein.

In an example embodiment, the one or more manipulation sources 60 comprise one or more lasers (e.g., optical lasers, microwave sources, and/or the like). In various embodiments, the one or more manipulation sources 60 are configured to manipulate and/or cause a controlled quantum state evolution of one or more atomic objects within the atomic object confinement apparatus 70. For example, the one or more manipulation sources 60 comprise respective manipulation sources 60 configured to generate and provide the first manipulation signal, second manipulation signal, third manipulation signal, fourth manipulation signal, and/or the like. In an example embodiment, at least some of the manipulation signals are laser beams, laser pulse trains, and/or the like. For example, in an example embodiment, wherein the one or more manipulation sources 60 comprise one or more lasers, the lasers may provide one or more laser beams to the confinement apparatus within the cryostat and/or vacuum chamber 40. The laser beams may be used to perform various operations (e.g., parallel operations), such as enacting one or more quantum gates on one or more qubits and/or atomic objects, sympathetic cooling of one or more atomic objects, reading a qubit and/or determining a quantum state of an atomic object, initializing an atomic object into the qubit space, and/or the like. In various embodiments, the manipulation sources 60 are controlled by respective driver controller elements 1015 (see FIG. 10) of the controller 30.

In various embodiments, the quantum computer 110 comprises one or more voltage sources 50. For example, the voltage sources 50 may comprise a plurality of TT voltage drivers and/or voltage sources and/or at least one RF driver and/or voltage source. The voltage sources 50 may be electrically coupled to the corresponding potential generating elements (e.g., TT electrodes 156, RF rail electrodes, RF bus electrodes) of the atomic object confinement apparatus 70, in an example embodiment. For example, the voltage sources 50 are configured to provide (RF) oscillating voltage signals to the RF rail electrodes and RF bus electrodes of the atomic object confinement apparatus 70. For example, the voltage sources 50 are configured to provide controlling voltage signals to the TT electrodes of the sequences of TT electrodes 74. In various embodiments, the voltages sources 50 are controlled by respective driver controller elements 1015 of the controller 30.

In various embodiments, the quantum computer 110 comprises one or more magnetic field generators 80 (e.g., 80A, 80B). For example, the magnetic field generator may be an internal magnetic field generator 80A disposed within the cryogenic and/or vacuum chamber 40 and/or an external magnetic field generator 80B disposed outside of the cryogenic and/or vacuum chamber 40. In various embodiments, the magnetic field generators 80 are permanent magnets, Helmholtz coils, electrical magnets, and/or the like. In various embodiments, the magnetic field generators 80 are configured to generate a magnetic field at one or more regions of the atomic object confinement apparatus 70 that has a particular magnitude and a particular magnetic field direction in the one or more regions of the atomic object confinement apparatus 70. In an example embodiment, the particular magnetic field direction defines the z-direction of the Bloch sphere representation of the qubit. In an example embodiment, the particular magnitude is substantially equal to 5.9 Gauss. In an example embodiment, operation of the one or more magnetic field generators 80 is controlled by the controller 30. In an example embodiment, at least one of the magnetic field generators 80 is a permanent magnet and therefore is not controlled by the controller 30.

In various embodiments, a computing entity 10 is configured to allow a user to provide input to the quantum computer 110 (e.g., via a user interface of the computing entity 10) and receive, view, and/or the like output from the quantum computer 110. The computing entity 10 may be in communication with the controller 30 of the quantum computer 110 via one or more wired or wireless networks 20 and/or via direct wired and/or wireless communications. In an example embodiment, the computing entity 10 may translate, configure, format, and/or the like information/data, quantum circuits, quantum computing algorithms, and/or the like into a computing language, executable instructions, command sets, and/or the like that the controller 30 can understand and/or implement.

In various embodiments, the controller 30 is configured to control the voltage sources 50, cryogenic system and/or vacuum system controlling the temperature and pressure within the cryostat and/or vacuum chamber 40, manipulation sources 60, magnetic field generators 80, and/or other systems controlling various environmental conditions (e.g., temperature, pressure, and/or the like) within the cryostat and/or vacuum chamber 40 and/or configured to manipulate and/or cause a controlled evolution of quantum states of one or more atomic objects within the atomic object confinement apparatus 70. For example, the controller 30 may cause a controlled evolution of quantum states of one or more atomic objects within the atomic object confinement apparatus 70 to execute a quantum circuit and/or algorithm. For example, the controller 30 is configured to execute a quantum circuit comprising one or more general gates and/or one or more global gates, in various embodiments.

In various embodiments, the atomic objects confined within the atomic object confinement apparatus 70 are used as qubits of the quantum computer 110 and/or quantum processor 115. For example, the quantum processor 115 may include a plurality of multi-atomic object crystals that each comprise a first atomic object used as a qubit atomic object of the quantum processor (embodying a qubit of the quantum processor 115) and a second atomic object used as a sympathetic cooling atomic object for use in cooling the qubit atomic object of the same multi-atomic object crystal.

III. EXAMPLE QUBIT REPRESENTATION

In various embodiments, an atomic object confined by the atomic object confinement apparatus is used as a qubit of the quantum processor and/or quantum computer. For example a two-state sub-space of the quantum states of the atomic object are defined as a qubit space. In various embodiments, the qubit space is defined as two hyperfine states. For example, FIG. 2 illustrates a partial energy diagram 200 of an example atomic object. The qubit space 210 is defined to include two distinct hyperfine states. For example, in an example embodiment wherein the atomic object is singly-ionized ytterbium, the hyperfine states of the qubit space 210 may be the F=0, m=0 state of the S-manifold and the F=1, m=1 state of the S-manifold. In various embodiments, the two states of the qubit space 210 are separated by an energy corresponding to a particular frequency separation $v_s$ (e.g., the energy difference between the two states of the qubit space 210 is $hv_s$, where h is Planck's constant). In an example embodiment where the atomic object is singly-ionized ytterbium, the particular frequency separation $v_s$ is approximately 12.64 GHz when the magnetic field is approximately 5.9 Gauss.

Figure 3:
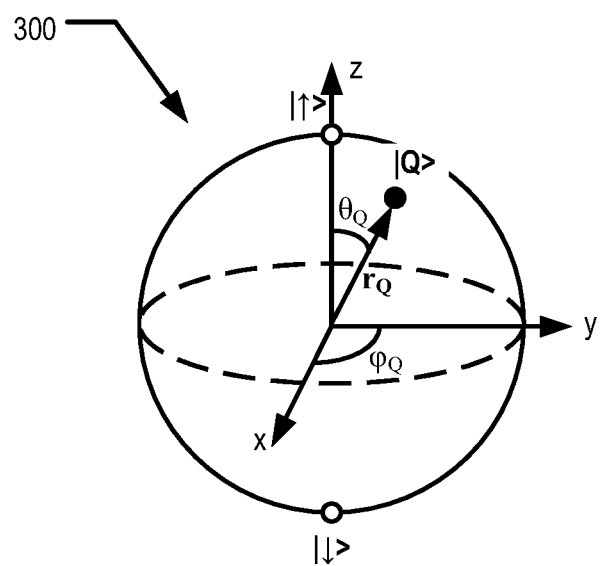
FIG. 3 illustrates a Bloch sphere representation of an example qubit, in accordance with an example embodiment.

As noted above, a Bloch sphere representation may be used to generally describe or model a qubit. FIG. 3 illustrates an example Bloch sphere representation 300 of a qubit in qubit state |Q> represented by a point on the unit sphere corresponding to qubit vector $r_Q$. A first state of the qubit space 210 is defined at the intersection of the surface of the unit sphere with the positive z-axis and a second state of the qubit space 210 is defined at the intersection of the surface of the unit sphere with the negative z-axis. The qubit vector $r_Q$ is define by the azimuthal angle θ, which describes the relationship between the qubit vector $r_Q$ and the positive z-axis, and the phase angle φ, which lies in the xy plane. For example, the qubit vector $r_Q$ can be represented as (sin(θ) cos(φ), sin(θ) sin(φ), cos(θ)).

In various embodiments, a frame rotation is implemented (e.g., as a global single-qubit gate, in an example embodiment). As used herein a frame rotation is a unitary operation that causes the local reference frame of the Bloch sphere representation of the qubit to be rotated with respect to an externally defined reference frame. For example, in various embodiments, the externally defined reference frame is defined by aligning the z-axis with the magnetic field direction. For example, a frame rotation may be configured to rotate the qubit vector $r_Q$ such that the x-component of the qubit vector $r_Q$ is aligned with the externally defined z-axis, such that the y-component of the qubit vector $r_Q$ is aligned with the externally defined z-axis, such that the local reference frame of the Bloch sphere is realigned with the externally defined reference frame, and/or the like.

In various embodiments, performance of a gate (e.g., a global single-qubit gate, two-qubit gate, and/or the like) on a qubit causes the qubit to accumulate a phase shift (e.g., an AC Stark shift and/or the like). For example, the interaction of the manipulation signal with the atomic object may result in a phase shift of the qubit. In various embodiments, the quantum computer (e.g., controller 30) is configured to track the phase shift of the qubit (in real-time or near real-time) and update a respective qubit record corresponding to the qubit to track the phase shift accumulated by each qubit. In various embodiments, a gate may be modified to account for the accumulated phase shift of a qubit and/or a gate may be enacted to modify the phase of the qubit based on the accumulated phase shift of the qubit. For example, U.S. application Ser. No. 16/716,973, filed Dec. 17, 2019, describes some examples of tracking phase shifts accumulated by qubits and physically accounting for the accumulated phase shift.

IV. EXAMPLE GATE SET PRIMITIVES

As described above, a gate set is defined by a set of gate set primitives. The gate set primitives can be used as stand-alone gates and/or used as building blocks for building additional gates. In various embodiments the gate set primitives include global single-qubit gates and two-qubit gates.

In an example embodiment wherein the atomic objects are ions, the gate set is based on the Pauli group on one qubit. The elements of the Pauli group on one qubit are often represented as two-by-two matrices such that $$X = \begin{pmatrix} 0 & 1 \\ 1 & 0 \end{pmatrix}, Y = \begin{pmatrix} 0 & -i \\ i & 0 \end{pmatrix}, \text{and } Z = \begin{pmatrix} 1 & 0 \\ 0 & -1 \end{pmatrix},$$

such that the Pauli group is given by {±I, ±iI, ±X, ±iX, ±Y, ±iY, ±Z, ±iZ}, where I is the two-by-two identity matrix. A standard single-qubit gate is implemented by applying a stimulated Raman transition between the qubit space 210 and an excited state of the atomic object. This is generally accomplished by causing a first manipulation signal and second manipulation signal with the frequency offset therebetween being approximately $v_s$ to be incident on the atomic object. Up to small errors due to spontaneous emission, this interaction corresponds to a unitary evolution U of the qubit state of a $j^{th}$ qubit is given by $$U_j(\Delta\theta, \Delta\varphi) = \exp\left[-i\frac{\Delta\theta}{2}(X\cos\Delta\varphi + Y\sin\Delta\varphi),\right.$$

where $\Delta\theta$ is the rotation angle and is proportional to the manipulation signal power level, manipulation signal frequency, duration (e.g., length of time), and/or a combination thereof of the manipulation signal being applied to the atomic object (e.g., and the amount of time the interaction is applied). The angle $\Delta\varphi$ corresponds to the phase difference between the first and second manipulation signals.

In various embodiments, the gate set comprises gate primitives that are global single-qubit gates. A global single-qubit gate can be implemented on two or more qubits by the two or more qubits being located proximate one another such that the first and second manipulation signals are incident on both (all) of the two or more qubits. Each of the two or more qubits is rotated in same manner (e.g., as described by the unitary evolution U). For example, the global single-qubit gate corresponds to the unitary operator $U_G(\Delta\theta, \Delta\varphi) = U_1(\Delta\theta, \Delta\varphi) \otimes U_2(\Delta\theta, \Delta\varphi)$, where $\otimes$ indicates the Kronecker product of the single-qubit unitary operator $U_1$, which only acts on a first qubit and the single-qubit operator $U_2$, which only acts on a second qubit. Thus, both the first qubit and the second qubit undergo the rotation indicated by $\Delta\theta, \Delta\varphi$ as a result of the global single-qubit gate corresponding to $U_G(\Delta\theta, \Delta\varphi)$ being performed on the first and second qubits.

Figure 4:
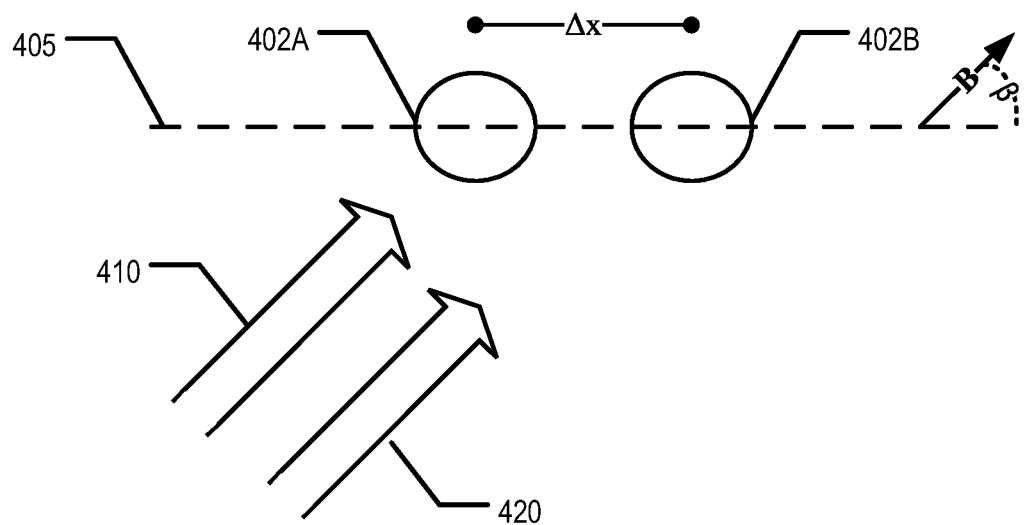
FIG. 4 is a schematic diagram illustrating a global single-qubit gate configuration, according to an example embodiment.

FIG. 4 illustrates a configuration for performing an example global single-qubit gate on a first qubit embodied as a first atomic object 402A and a second qubit embodied as a second atomic object 402B. The first atomic object 402A and the second atomic object 402B are aligned along axis 405. In various embodiments, a magnetic field B present at the location of the first atomic object 402A and the second atomic object 402B has a magnetic field direction that forms an angle β with the axis 405. In an example embodiment, the angle β is substantially equal to 45 degrees. The first atomic object 402A and the second atomic object 402B are separated by a separation distance Δx. In various embodiments, the separation distance Δx is configured such that the first atomic object 402A and the second atomic object 402B are proximate one another such that the first manipulation signal 410 and the second manipulation signal 420 are incident on both the first atomic object and the second atomic object. For example, the separation distance Δx is no more than the spot size of the first manipulation signal 410 and/or the second manipulation signal 420 at the location of the first atomic object 402A and the second atomic object 402B. In an example embodiment, the first manipulation signal 410 and the second manipulation signal 420 are focused to a spot size of approximately 35 μm at the location of the first atomic object 402A and the second atomic object 402B.

In various embodiments, the first manipulation signal 410 and the second manipulation signal 420 are configured to cause the first atomic object 402A and the second atomic object 402B to experience stimulated Raman transitions. In an example embodiment, the first manipulation signal 410 and the second manipulation signal 420 are phase-locked with one another. In an example embodiment, the first manipulation signal 410 and the second manipulation signal 420 laser beams with a wavelength of approximately 372.5 nm and the frequency offset between the first manipulation signal 410 and the second manipulation signal 420 is approximately $v_s$. For example, in an example embodiment, the third manipulation signal has a frequency of approximately c/(372.5 nm) (where c is the speed of light) and the fourth manipulation signal has a frequency of approximately c/(372.5 nm)±$v_s$. In various embodiments, the first manipulation signal 410 and the second manipulation signal 420 are co-propagating laser beams (e.g., laser beams that are propagating in respective propagations directions that are substantially parallel to one another). In various embodiments, the first manipulation signal 410 and the second manipulation signal 420 are both σ+-polarized Raman laser beams. In an example embodiment, the first manipulation signal and the second manipulation signal propagate in a direction that is substantially parallel to the magnetic field direction. For example, the first manipulation signal and the second manipulation signal form an angle β with the axis 405, in an example embodiment.

In various embodiments, a global single-qubit gate is used as a frame rotation. For example, a global single-qubit gate may be used to rotate the local reference frame of each qubit on which the global single-qubit gate is performed in the same manner.

In various embodiments, a Mølmer-Sørensen (MS) gate may be used as a two-qubit gate primitive. The MS gate is configured to cause the transformations $$|\uparrow\uparrow\rangle \rightarrow (|\uparrow\uparrow\rangle + i|\downarrow\downarrow\rangle)/\sqrt{2}$$
$$|\uparrow\downarrow\rangle \rightarrow (|\uparrow\downarrow\rangle - i|\downarrow\uparrow\rangle)/\sqrt{2}$$
$$|\downarrow\uparrow\rangle \rightarrow (|\downarrow\uparrow\rangle - i|\uparrow\downarrow\rangle)/\sqrt{2},$$
$$|\downarrow\downarrow\rangle \rightarrow (|\downarrow\downarrow\rangle + i|\uparrow\uparrow\rangle)/\sqrt{2}$$

where the ket $|\uparrow\downarrow\rangle$, for example, indicates that the first qubit is in state $|\uparrow\rangle$ and the second qubit is in the state $|\downarrow\rangle$. The unitary operator for the MS gate is $$U_{MS}(\Delta\theta, \Delta\varphi_1, \Delta\varphi_2) =$$
$$\exp\left[-i\frac{\Delta\theta}{2}(X\cos(\Delta\varphi_1) + Y\sin(\Delta\varphi_1)) \otimes (X\cos(\Delta\varphi_2) + Y\sin(\Delta\varphi_2))\right],$$

where $\Delta\varphi_1$ and $\Delta\varphi_2$ are defined by the phases of the manipulation signals (e.g., a third manipulation signal and a fourth manipulation signal) used to perform the MS gate and the relative position of the atomic objects.

As it can be technically difficult to maintain phase coherence between the first and second manipulation signals 410, 420 used to perform the global single-qubit gates and third and fourth manipulations signals 510, 520 (see FIG. 5) used to perform the two-qubit gates, in various embodiment, a rotated MS gate that is phase-independent is used. For example, the MS gate may be performed by performing an initial frame rotation with the third and fourth manipulations signals 510, 520 to the first and second qubits, then performing the MS gate, and then performing a finishing frame rotation (using another instance of the third and fourth manipulation signals 510, 520) to the first and second qubits to return the local reference frame into alignment with the externally defined reference frame. In an example embodiment, the first frame rotation is configured to cause the phase-independent MS gate to be an interation in the z-bases such that unitary operator for the two-qubit gate primitive is given as $$U_{ZZ}(\Delta\theta) = \exp\left[-i\frac{\Delta\theta}{2}ZZ\right].$$

In various embodiments, the gate set includes the phase-independent MS two-qubit gate $U_{ZZ}$.

In an example embodiment, another phase-independent two-qubit gate is included that includes two MS gate primitives performed in sequence with a π/2 phase update between first instance of the MS gate primitive and the second MS gate primitive. The result of the sequence of MS gate primitives is an imaginary swap or iSWAP(Δϕ) two-qubit gate given by unitary operator $$U_i(\Delta\theta, \Delta\phi) = U_{MS}(\Delta\theta, \Delta\varphi_1, \Delta\varphi_2)U_{MS}(\Delta\theta, \Delta\varphi_1 + \pi/2, \Delta\varphi_2 + \pi/2) =$$
$$\exp\left[-i\frac{\Delta\theta}{2}((XX + YY)\cos\Delta\phi + (XY - YX)\sin\Delta\phi)\right],$$

where $\Delta\phi = \Delta\varphi_1 - \Delta\varphi_2$. The anti-symmetric two-qubit gate is an example of the iSWAP(Δϕ) two-qubit gate where Δϕ=π/2. The phase difference Δϕ is set by the separation distance Δx (e.g., the distance between the first atomic object 402A and the second atomic object 402B) relative to the wavelength of the standing wave created by third and fourth manipulation signals used to perform the multiple-qubit gate. For example, if λ is the wavelength of the standing wave created by the third and fourth manipulation signals at the first and second atomic objects 402A, 402B, and Δϕ/λ=½, then $$\Delta\phi = \frac{2\pi}{2} = \pi.$$

In various embodiments, the gate set includes the phase-independent iSWAP two-qubit gate $U_i$.

In various embodiments, the Δθ of the unitary gate $U_i(\Delta\theta, \Delta\phi)$ is set to a particular angle to provide a perfect entangler. For example, Δθ is set to π/2, in an example embodiment. In another example embodiment, Δθ is set to π/4 (e.g., $U_i(\pi/4, \Delta\phi)$) so as to provide a square root of iSWAP gate (e.g., sqrt(iSWAP)). The sqrt(iSWAP) gate is a perfect entangler (e.g., can be used to create a two-qubit Bell state) but requires half the total rotation angle as the standard iSWAP gate (e.g., generally $U_i(\pi/2, \Delta\phi)$). As described in more detail elsewhere herein, reducing the total angle of rotation can lead to smaller errors. Thus, the sqrt(iSWAP) gate generally includes smaller errors than other perfect entangler gates that require larger total angles of rotation.

Figure 5:
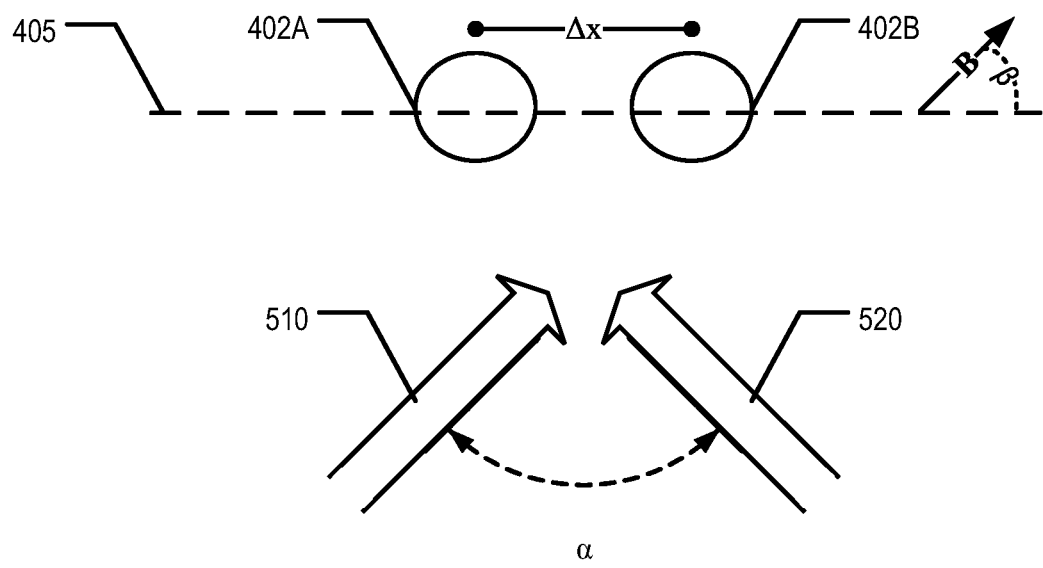
FIG. 5 is a schematic diagram illustrating a two-qubit gate configuration, according to an example embodiment.

FIG. 5 illustrates a configuration for performing an example phase-independent two-qubit gate (e.g., a phase-independent MS gate $U_{ZZ}$, a phase-independent iSWAP and/or sqrt (iSWAP) qubit gate $U_i$, and/or the like) on a first qubit embodied as the first atomic object 402A and a second qubit embodied as the second atomic object 402B. The first atomic object 402A and the second atomic object 402B are aligned along axis 405. In various embodiments, a magnetic field B present at the location of the first atomic object 402A and the second atomic object 402B has a magnetic field direction that forms an angle β with the axis 405. In an example embodiment, the angle β is substantially equal to 45 degrees. The first atomic object 402A and the second atomic object 402B are separated by a separation distance Δx along the axis 405. In various embodiments, the separation distance Δx is configured such that the first atomic object 402A and the second atomic object 402B are proximate one another such that the third manipulation signal 510 and the fourth manipulation signal 520 are incident on both the first atomic object and the second atomic object. For example, the separation distance Δx is no more than the spot size of the third manipulation signal 510 and/or the fourth manipulation signal 520 at the location of the first atomic object 402A and the second atomic object 402B. In an example embodiment, the third manipulation signal 510 and the fourth manipulation signal 520 are focused to a spot size of approximately 35 μm at the location of the first atomic object 402A and the second atomic object 402B.

In an example embodiment, for the performance of the phase-independent iSWAP and/or sqrt(iSWAP) two-qubit gate, the separation distance Δx is for the symmetric iSWAP and/or sqrt(iSWAP) portion of the interaction (e.g., the (XX±YY) interaction) such that Δϕ=nπ=ΔkΔx, where n is an integer and Δk is the magnitude of the wavevector difference between the third manipulation signal 510 and the fourth manipulation signal 520. In an example embodiment, ΔkΔx≈27π. In an example embodiment, for the performance of the phase-independent iSWAP and/or sqrt(iSWAP) two-qubit gate, the separation distance Δx is for the anti-symmetric iSWAP and/or sqrt(iSWAP) portion of the interaction (e.g., the (XY−YX) interaction) such that Δϕ=(n+½)π=ΔkΔx. In an example embodiment, ΔkΔx≈27.5π.

In various embodiments, the third manipulation signal 510 and the fourth manipulation signal 520 are configured to cause the first atomic object 402A and the second atomic object 402B to experience a two-qubit gate. In an example embodiment, the third manipulation signal 510 and the fourth manipulation signal 520 are phase-locked with one another. In an example embodiment, the third manipulation signal 510 and the fourth manipulation signal 520 laser beams with a wavelength of approximately 372.5 nm and the frequency offset between the third manipulation signal 510 and the third manipulation signal 520 is approximately $v_s$. For example, in an example embodiment, the third manipulation signal has a frequency of approximately c/(372.5 nm) and the fourth manipulation signal has a frequency of approximately c/(372.5 nm)±$v_s$. In various embodiments, the third manipulation signal 510 and the fourth manipulation signal 520 are propagating laser beams with a relative angle α therebetween. In an example embodiment, the angle α is approximately 90 degrees. For example, in an example embodiment, the wavevector difference is parallel to the z-direction (e.g., $\Delta k \| \hat{z}$). In various embodiments, the third manipulation signal 510 and the fourth manipulation signal 520 are both linearly-polarized Raman laser beams with the polarization direction of the third manipulation signal being perpendicular to the polarization direction of the fourth manipulation signal.

In various embodiments, the gate set may further include a "software" single-qubit gate, which is performed by using the tracked phase of the qubit (e.g., stored in the respective qubit record) to update the phase of future single-qubit gates performed on a given qubit. Such a "software" gate corresponds to rotations about the z-axis, such as $$R_z(\Delta\varphi) = \exp\left[-i\frac{\Delta\varphi}{2}Z\right],$$

which commutes with the phase-independent rotated MS two-qubit gate $U_{ZZ}$ but does not commute with the phase-independent iSWAP and/or sqrt(iSWAP) two-qubit gate $U_i$. As previously noted, performance of a gate on a qubit imparts or induces a (small) AC Stark shift on each qubit that, up to calibration errors, corresponds to an $R_z(\Delta\varphi)$ "software" gate. Any arbitrary single-qubit gat can be decomposed into two such "software" gates and one Raman gate as $R_z(\theta_1)U(\theta_2,0)R_z(\theta_3)$.

In various embodiments, various quantum circuits are built using gate set primitives, gates built from gate set primitives, and/or the like including global single-qubit gates, phase-independent two-qubit gates, and "software" gates. For example, various gate primitives may be used to build and/or perform general gates and/or individual single-qubit gates that include two-qubit gate primitives.

V. EXAMPLE PERFORMANCE OF A GENERAL GATE

Various embodiments include the performance of general gate (e.g., a general two-qubit gate), a quantum computer controller configured to cause a quantum computer and/or quantum processor to perform a general gate, and/or a quantum computer configured to perform a general gate. In various embodiments, a general gate is a two-qubit arbitrary angle gate.

In various embodiments, the two-qubit gates of the gate set are elements of the group SU($2^m$), where m is the number of qubits acted upon by the gate. For example, for the two state qubit space 210, a two-qubit gate configured to act on two qubits is an element of the group SU(4). In general, SU($2^m$) is the Lie group of $2^m \times 2^m$ unitary matrices with a determinant of one. Using the gate set primitives, an arbitrary two-qubit gate V can be built, where V∈ SU($2^m$). In an example where m=2, the arbitrary two-qubit gate V can be decomposed via the Cartan decomposition to V=$U^1 \otimes U^2$exp[−i($\theta_x$XX+$\theta_y$YY+$\theta_z$ZZ)/2]$U^3 \otimes U^4$=$U^1 \otimes U^2 U_M U^3 \otimes U^4$, where $U^1$, $U^2$, $U^3$, and $U^4$ are arbitrary individual single-qubit gates and two-qubit gate $U_M$=exp[−i($\theta_x$XX+$\theta_y$YY+$\theta_z$ZZ)/2]. In other words, performance of the two-qubit gate $U_M$ causes a rotation of the respective qubit through an arbitrary angle. In various embodiments the phase-independent rotated MS two-qubit gate $U_{ZZ}$ is performed as an arbitrary angle gate (e.g., with an arbitrary angle, rather than a set angle). In various embodiments, the phase-independent iSWAP and/or sqrt(iSWAP) two-qubit gate $U_i$ is performed as an arbitrary angle gate (e.g., as an anti-symmetric gate).

In an example embodiment, the two-qubit gate is performed as $U_M(\theta_x, \theta_y, \theta_z)$=$U_G(\pi/2,\pi/2)U_{ZZ}(\theta_x)U_G(\pi/2,-\pi/2)$ $U_G(\pi/2,0)U_{ZZ}(\theta_y)U_G(\pi/2,-\pi)U_{ZZ}(\theta_z)$. In various embodiments, the $U_M$ gate is decomposed into three two-qubit gates and three to five frame rotations.

A new challenge that arises in the performance of general gates, is that any software gates should be physically applied before the performance of the $U_M$ gate in order to synchronize the phases between the qubits to which the general gate is to be applied, since $R_z(\theta)$ does not commute with the gate $U_M$. In various embodiments, the software gates are physically applied by including any AC stark shifts from the qubits' histories (e.g., as indicated by the respective qubit record). For example, the $U^1 \otimes U^2$ of the arbitrary multiple gate V can be compiled as $U(\theta_1, 0)U(\theta_2,\pi/2)U(\theta_3, 0)$, where $\theta_1$, $\theta_2$, and $\theta_3$ take into account the AC stark shifts from the respective qubit's histories. In various embodiments, the software gates are physically applied by applying a physical phase update to at least one qubit that the two-qubit gate is to be performed on. For example, the qubit's physical phase may be updated by performing the single-qubit gate U(π, β/4)U(π,π−β/4), where β is the phase difference between the qubits on which the two-qubit gate is be performed.

Figure 6:
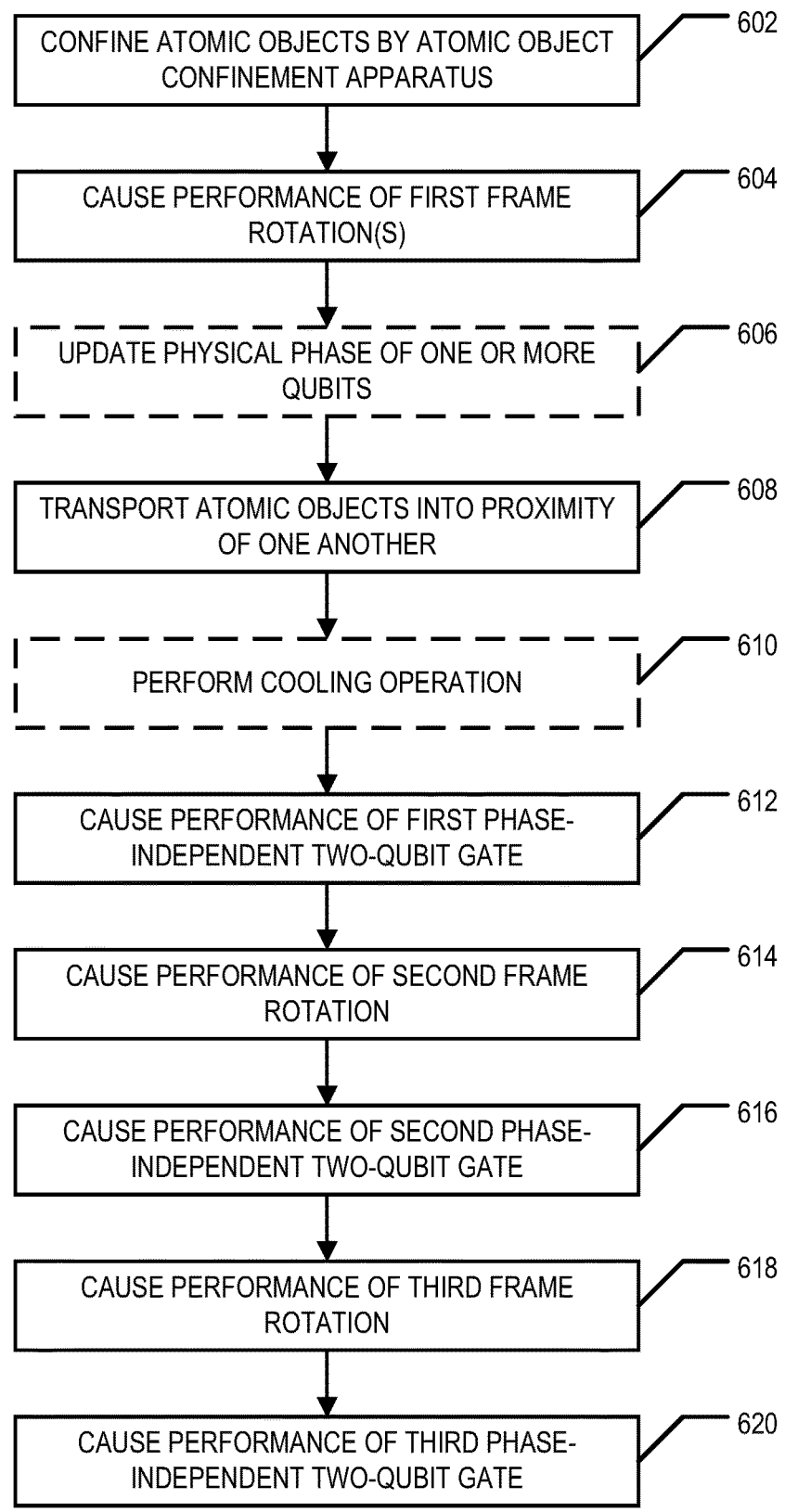
FIG. 6 is a flowchart illustrating processes, procedures, and/or operations for performing a general gate, according to an example embodiment.

FIG. 6 illustrates a flowchart illustrating various processes, procedures, operations, and/or the like, for performing a general two-qubit gate. Starting at step/operation 602, two or more atomic objects are confined by an atomic object confinement apparatus 70. For example, the controller 30 of a quantum computer may operate and/or cause operation of one or more voltage sources 50 to cause a confinement potential to be generated by the RF rail electrodes 72 and/or sequences of TT electrodes 74 to confine two or more atomic objects by the atomic object confinement apparatus 70.

The controller 30 may cause the quantum processor to begin performance and/or execution of a quantum circuit. For example, the controller 30 may control the operation of the voltage sources 50 to transport various atomic objects confined by the atomic object confinement apparatus 70 to particular positions within the atomic object confinement apparatus, control the operation of the manipulation sources 60 to cause one or more manipulation signals to be incident on the various atomic objects at the particular positions to cause one or more operations and/or functions of the quantum processor to be performed (e.g., single-qubit gates, two-qubit gates, qubit initialization (e.g., causing an atomic object to be initialized into a quantum state within the qubit space), reading of a qubit, and/or the like). At some point during the performance and/or execution of the quantum circuit a first qubit embodied by a first atomic object and a second qubit embodied by a second atomic object are to be interacted and/or to have a two-qubit gate (e.g., a general two-qubit gate) performed thereon.

At step/operation 604, a first frame rotation is performed. For example, a first individually addressed single-qubit gate U (π/2, π/2) on the first atomic object is performed. For example, the controller 30 may cause one or more manipulation sources 60 to generate and provide respective first instances of a first manipulation signal 410 and a second manipulation signal 420 such that the respective first instances of the first manipulation signal 410 and the second manipulation signal 420 are incident on both the first atomic object and the second atomic object. The power present in the respective first instances of the first manipulation signal 410 and the second manipulation signal 420 and the length of time that the respective first instances of the first manipulation signal 410 and the second manipulation signal 420 are incident on (e.g., interacting with) the first atomic object is configured to cause the first atomic object to undergo a $\Delta\theta$ rotation of $\pi/2$. For example, the polar angle $\theta$ of the respective qubit vectors $r_Q$ of the first qubit (embodied by the first atomic object) is modified (e.g., changed in value) by $\pi/2$. A phase difference between the respective first instance of the first manipulation signal 410 and the second manipulation signal 420 is configured to cause the azimuthal angle $\varphi$ of the respective qubit vectors $r_Q$ of the first qubit (embodied by the first atomic object) is modified (e.g., changed in value) by $\pi/2$. The same procedure is repeated for the second atomic object.

At step/operation 606, the physical phase of at least one of the first qubit or the second qubit is updated. A new challenge that arises in the performance of general gates (e.g., gates corresponding to an arbitrary rotation), is that any software gates should be physically applied before the performance of the general gate in order to synchronize the phases between the qubits to which the general gate is to be applied, since $R_z(\theta)$ does not commute with the general gate $U_M$. In various embodiments, the software gates are physically applied and include any AC stark shifts from the qubits' histories (e.g., as indicated by the respective qubit record). For example, the $U^1 \otimes U^2$ of the arbitrary multiple gate V can be compiled as $U(\theta_1, 0)U(\theta_2, \pi/2)U(\theta_3, 0)$, where $\theta_1$, $\theta_2$, and $\theta_3$ take into account the AC stark shifts from the respective qubit's histories. In various embodiments, the software gates are physically applied by applying a physical phase update to at least one qubit that the two-qubit gate is to be performed on. For example, the qubit's physical phase may be updated by performing the single-qubit gate $U(\pi, \beta/4)U(\pi,\pi-\beta/4)$, where $\beta$ is the phase difference between the qubits on which the two-qubit gate is be performed. In various embodiments, the controller 30 controls operation of one or more manipulation sources 60 to provide manipulation signals that are incident on the first atomic object or the second atomic object to cause the physical phase of the first qubit (embodied by the first atomic object) or the second qubit (embodied by the second atomic object) to be updated. For example, updating the physical phase of the first qubit may include performing the gate primitives $U^1 \otimes U^2$ of the arbitrary multiple-angle gate V. In an example embodiment, the physical phase of the first qubit or the second qubit is updated as part of an individually addressed single-qubit gate performed at step/operation 604.

At step/operation 608, the first atomic object and the second atomic object are transported to respective locations within the atomic object confinement apparatus 70 that are proximate one another. In an example embodiment, the first atomic object and/or the second atomic object are transported such that the first atomic object and second atomic object are adjacent and/or neighboring one another (e.g., there are no other atomic objects disposed between the first atomic object and the second atomic object). For example, the controller 30 operates and/or causes operation of the voltage sources 50 such that controlling voltage signals are provided to the sequences of TT electrodes 74 that cause the first atomic object to move from a respective previous location to a first location and/or that cause the second atomic object to move from a respective previous location to a second location. The first location and the second location are proximate one another.

During the transportation of the first atomic object to the first location and/or the second atomic object to the second location, heating of the atomic objects may occur. At step/operation 610, a cooling operation may be performed to cool the first atomic object and/or the second atomic object. In an example embodiment, the cooling operation is a sympathetic cooling operation. For example, the controller 30 may cause one or more manipulation sources 60 to provide manipulation signals incident on sympathetic cooling atomic object(s) located near enough to a respective one of the first and/or second atomic objects such that the sympathetic cooling atomic object(s) are usable to extract heat from the first and/or second atomic objects.

In various embodiments, the first atomic object is located at the first location and the second atomic object is located at the second position throughout the performance of the $U_M$ gate. In particular, since all of the gate primitives used to build the $U_M$ gate are two-qubit gates or global single-qubit gates, no transportation of the first atomic object and/or the second atomic object occurs during the performance of the $U_M$ gate. Thus, the cooling operation only needs to be performed once (e.g., prior to the performance of the first phase-independent two-qubit gate).

In conventional two-qubit gates, it is common for the two-qubit gate to be built out of gate primitives that include individual single-qubit gates that are performed on only one qubit (e.g., individually addressed single-qubit gates). Therefore, in conventional scenarios, the first and second atomic object would be transported to be proximate one another for the performance of the two-qubit gate to be initiated, and then separated and brought back together multiple times (e.g., three times) throughout the performance of the gate. Thus, in conventional two-qubit gates, the cooling operation needs to be performed multiple times (e.g., three times). These additional performances of the cooling operation adds a significant amount of time to the performance of the two-qubit gate, leading to memory errors, drift errors, and other gate errors. Therefore, embodiments of the present invention provide improvements over conventional two-qubit gates in that the number of cooling operations required for performing the gate (without significant heating errors) is only one (e.g., one third of that required in conventional two-qubit gates) and cooling operation associated memory and/or drift errors are also significantly reduced.

At step/operation 612, a first phase-independent two-qubit gate primitive is performed. In an example embodiment, the first phase-independent two-qubit gate primitive is a phase-independent rotated MS gate $U_{zz}(\theta_x)$. While various embodiments use the phase-independent rotated MS gate $U_{zz}(\theta_x)$ as the phase-independent two-qubit gate primitive, in other embodiments the first phase-independent two-qubit gate primitive is a symmetric iSWAP and/or sqrt(iSWAP) gate. $U_i(\theta_x, \pi)$. For example, the controller 30 may cause one or more manipulation sources 60 to generate and provide a respective first instances of a third manipulation signal 510 and a fourth manipulation signal 520 such that the respective first instances of the third manipulation signal 510 and the fourth manipulation signal 520 are incident on both the first atomic object and the second atomic object. The power present in the respective first instances of the third manipulation signal 510 and the fourth manipulation signal 520, the frequency of the respective first instances of the third manipulation signal 510 and the fourth manipulation signal 520, and/or the duration that the respective first instances of the third manipulation signal 510 and the fourth manipulation signal 520 are incident on (e.g., interacting with) the first atomic object and the second atomic object is configured to cause an interaction between the first atomic object and the second atomic object characterized by rotation angle $\theta_x$.

At step/operation 614, a second frame rotation is performed. For example, a global single-qubit gate and/or a pair of global single-qubit gates $U_G(\pi/2,-\pi/2)U_G(\pi/2,0)$ is performed. For example, the controller 30 may cause one or more manipulation sources 60 to generate and provide respective second instances of a first manipulation signal 410 and a second manipulation signal 420 such that the respective second instances of the first manipulation signal 410 and the second manipulation signal 420 are incident on both the first atomic object and the second atomic object. The power present in the respective second instances of the first manipulation signal 410 and the second manipulation signal 420 and the length of time that the respective second instances of the first manipulation signal 410 and the second manipulation signal 420 are incident on (e.g., interacting with) the first atomic object and the second atomic object is configured to cause both the first atomic object and the second atomic object to undergo a $\Delta\theta$ rotation of $\pi/2$. For example, the polar angle $\theta$ of the respective qubit vectors $r_Q$ of the first qubit (embodied by the first atomic object) and the second qubit (embodied by the second atomic object) are modified (e.g., changed in value) by $\pi/2$. A phase difference between the respective second instance of the first manipulation signal 410 and the second manipulation signal 420 is configured to cause the azimuthal angle $\varphi$ of the respective qubit vectors $r_Q$ of the first qubit (embodied by the first atomic object) and the second qubit (embodied by the second atomic object) are modified (e.g., changed in value) by $-\pi/2$.

In an example embodiment, to complete the second frame rotation, the controller 30 may further cause the one or more manipulation sources 60 to generate and provide respective second instances of a first manipulation signal 410 and a second manipulation signal 420 such that the respective third instances of the first manipulation signal 410 and the second manipulation signal 420 are incident on both the first atomic object and the second atomic object. The power present in the respective third instances of the first manipulation signal 410 and the second manipulation signal 420 and the length of time that the respective third instances of the first manipulation signal 410 and the second manipulation signal 420 are incident on (e.g., interacting with) the first atomic object and the second atomic object is configured to cause both the first atomic object and the second atomic object to undergo a $\Delta\theta$ rotation of $\pi/2$. For example, the polar angle $\theta$ of the respective qubit vectors $r_Q$ of the first qubit (embodied by the first atomic object) and the second qubit (embodied by the second atomic object) are modified (e.g., changed in value) by $\pi/2$. The phases of the respective third instances of the first manipulation signal 410 and the second manipulation signal 420 are aligned, in an example embodiment, such that the azimuthal angle $\varphi$ of the respective qubit vectors $r_Q$ of the first qubit (embodied by the first atomic object) and the second qubit (embodied by the second atomic object) are unchanged and/or unmodified (up to small errors, included AC Stark shift, and/or the like).

At step/operation 616, a second phase-independent two-qubit gate primitive is performed. In an example embodiment, the second phase-independent two-qubit gate primitive is a phase-independent rotated MS gate $U_{ZZ}(\theta_y)$. In an example embodiment, the second phase-independent two-qubit gate primitive is asymmetric iSWAP and/or sqrt (iSWAP) gate $U_i(\theta_y, \pi)$. For example, the controller 30 may cause one or more manipulation sources 60 to generate and provide respective second instances of a third manipulation signal 510 and a fourth manipulation signal 520 such that the respective second instances of the third manipulation signal 510 and the fourth manipulation signal 520 are incident on both the first atomic object and the second atomic object. The power present in the respective second instances of the third manipulation signal 510 and the fourth manipulation signal 520, the frequency of the respective first instances of the third manipulation signal 510 and the fourth manipulation signal 520, and/or the duration that the respective second instances of the third manipulation signal 510 and the fourth manipulation signal 520 are incident on (e.g., interacting with) the first atomic object and the second atomic object is configured to cause an interaction between the first atomic object and the second atomic object characterized by rotation angle $\theta_y$.

At step/operation 618, a third frame rotation is performed. For example, a second global single-qubit gate $U_G(\pi/2,-\pi)$ is performed. For example, the controller 30 may cause one or more manipulation sources 60 to generate and provide respective fourth instances of a first manipulation signal 410 and a second manipulation signal 420 such that the respective fourth instances of the first manipulation signal 410 and the second manipulation signal 420 are incident on both the first atomic object and the second atomic object. The power present in the respective fourth instances of the first manipulation signal 410 and the second manipulation signal 420 and the length of time that the respective fourth instances of the first manipulation signal 410 and the second manipulation signal 420 are incident on (e.g., interacting with) the first atomic object and the second atomic object is configured to cause both the first atomic object and the second atomic object to undergo a $\Delta\theta$ rotation of $\pi/2$. For example, the polar angle $\theta$ of the respective qubit vectors $r_Q$ of the first qubit (embodied by the first atomic object) and the second qubit (embodied by the second atomic object) are modified (e.g., changed in value) by $\pi/2$. A phase difference between the respective fourth instance of the first manipulation signal 410 and the second manipulation signal 420 is configured to cause the azimuthal angle $\varphi$ of the respective qubit vectors $r_Q$ of the first qubit (embodied by the first atomic object) and the second qubit (embodied by the second atomic object) are modified (e.g., changed in value) by $-\pi$.

At step/operation 620, a third phase-independent two-qubit gate primitive is performed. In an example embodiment, the third phase-independent two-qubit gate primitive is a phase-independent rotated MS gate $U_{ZZ}(\theta_2)$. In an example embodiment, the second phase-independent two-qubit gate primitive is asymmetric iSWAP and/or sqrt (iSWAP) gate $U_i(\theta_2, \pi)$. For example, the controller 30 may cause one or more manipulation sources 60 to generate and provide respective third instances of a third manipulation signal 510 and a fourth manipulation signal 520 such that the respective third instances of the third manipulation signal 510 and the fourth manipulation signal 520 are incident on both the first atomic object and the second atomic object. The power present in the respective third instances of the third manipulation signal 510 and the fourth manipulation signal 520, the frequency of the respective first instances of the third manipulation signal 510 and the fourth manipulation signal 520, and/or the duration that the respective third instances of the third manipulation signal 510 and the fourth manipulation signal 520 are incident on (e.g., interacting with) the first atomic object and the second atomic object is configured to cause an interaction between the first atomic object and the second atomic object characterized by rotation angle $\theta_z$.

In various embodiments, if the general two-qubit gate is the last gate of the quantum circuit to be performed on the first atomic object or the second atomic object, a single-qubit gate (e.g., an individually addressed single-qubit gate) is performed on the first atomic object or the second atomic object (e.g., prior to the reading thereof).

Some example algorithms that call for two-qubit arbitrary angle gates (e.g., two-qubit gates corresponding to arbitrary rotations) include the quantum approximate optimization algorithm (QAOA) and quantum Fourier transform (QFT). Conventionally, these arbitrary angle gates are decomposed into two fixed angle gates with a total rotation of $\pi$. In another example, the standard decomposition of the $U_M$ gate includes three $\pi/2$ MS gates leading to a total rotation of $3\pi/2$. However, many of the errors in the MS gate (e.g., amplitude gate error, detuning errors, phase noise errors, spontaneous emission, and/or the like) are monotonically increasing functions of the total angle of rotation. Therefore, reducing the total rotation angle while still achieving the desired gate reduces the gate error. In general, the average total rotation of the general two-qubit gate is approximately $0.75\pi$, leading to a significant decrease in errors. Thus, the general two-qubit gate described herein provides a general gate (e.g., corresponding to an arbitrary angle rotation) that results in less/smaller errors compared to conventional general gates generated using fixed angles.

VI. EXAMPLE CALIBRATION OF ARBITRARY ANGLE AND GENERATION OF MANIPULATION SIGNAL BASED THEREON

In various embodiments, a two-qubit arbitrary angle gate is provided. One potential challenge to performing a two-qubit arbitrary angle gate is that calibration of the manipulation signal such that the desired arbitrary angle is affected is difficult due to the calibration involving verifying performance across a continuous range (e.g., a continuous range of possible arbitrary angles/rotations) rather than a set of discrete values (e.g., a set of fixed angles/rotations).

In various embodiments, the manipulation signal (e.g., first manipulation signal 410, second manipulation signal 420, third manipulation signal 510, or fourth manipulation signal 520) is generated by a respective manipulation source 60 such as a laser. For example, the manipulation source 60 may comprise a laser configured to generate a laser beam. The laser beam is then passed to a modulator, such as an acousto-optical modulator (AOM). The AOM is configured to modulate and/or control the amplitude, frequency, and/or phase of the manipulation signal based on an (electrical) input signal. The arbitrary angle rotation performed by the gate is proportional to the energy incident on and/or delivered to the first atomic object and/or the second atomic object by the pair of manipulation signals (e.g., first and second manipulation signals 410, 420 or third and fourth manipulation signals 510, 520). For example, the arbitrary angle rotation performed by the gate is a function of the respective power levels of the manipulation signals incident on the first atomic object and/or second atomic object, the respective frequencies of the manipulation signals incident on the first atomic object and/or second atomic object, and the duration and/or amount of time the manipulation signals are incident on and/or interacting with the first atomic object and/or the second atomic object.

Figure 7:
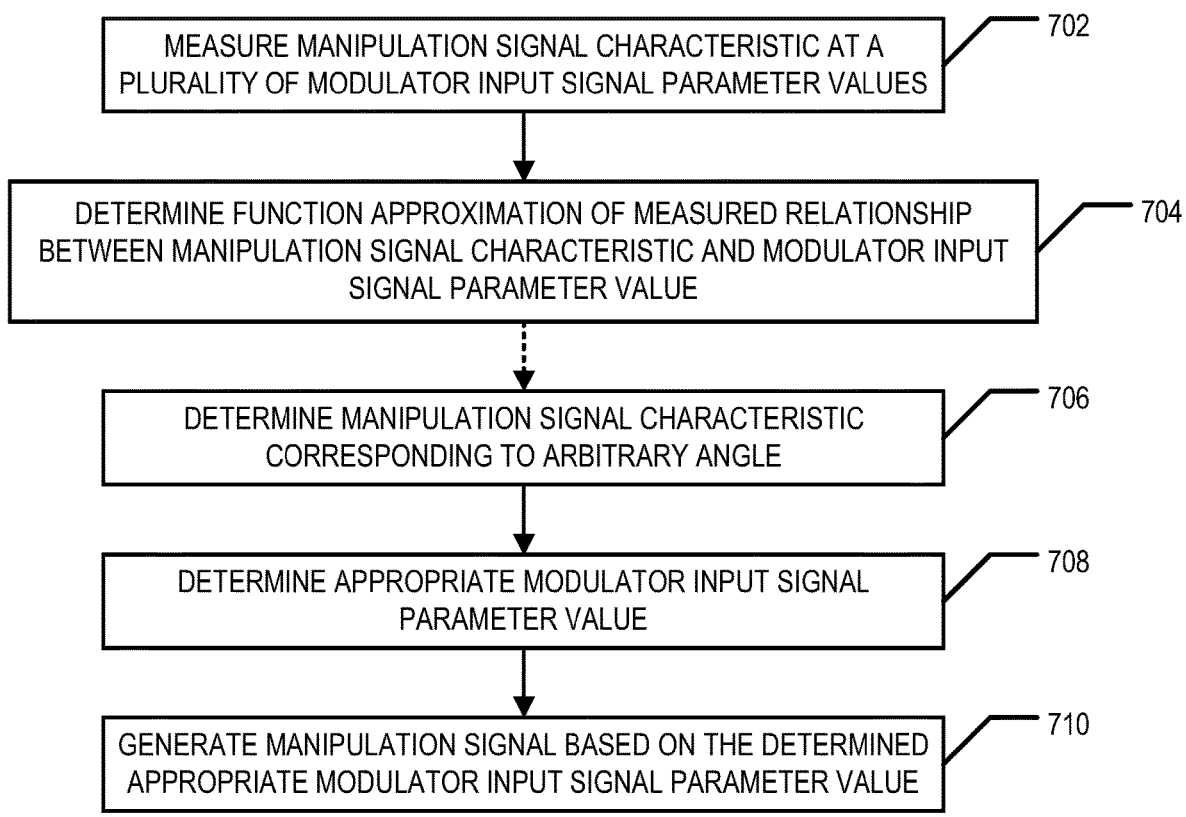
FIG. 7 is a flowchart illustrating processes, procedures, and/or operations for generating a manipulation signal used to perform a general gate, according to an example embodiment.

FIG. 7 provides a flowchart illustrating processes, procedures, operations, and/or the like for calibrating the arbitrary angle and generating a manipulation signal for use in performing an arbitrary angle gate. In various embodiments, a processing device 1005 (see FIG. 10) of the controller 30 and/or a processing device 1108 (see FIG. 11) of the computing entity 10 executes computer-executable code and/or instructions (e.g., stored in memory 1010, 1122, 1124) to perform the processes, procedures, operations, and/or the like of FIG. 7.

Starting at step/operation 702, a characteristic of the manipulation signal (e.g., power, frequency, duration and/or combination thereof) is measured for a plurality of modulator input signal parameter values. For example, the power (e.g., energy per period of time) provided by the manipulation signal may be measured at a plurality of modulator input signal parameter values. In another example, the frequency and/or frequency spectrum of the manipulation signal may be measured at a plurality of modulator input signal parameter values. In another example, the duration of the manipulation signal provided is measured at a plurality of modulator input signal parameter values. In various embodiments, various combinations of the power, frequency, and/or duration of the manipulation signal provided area measured at a plurality of modulator input signal parameter values. In various embodiments, the measurement is performed and/or controlled by the controller 30 and/or the computing entity 10. For example, the controller 30 may control the manipulation source 60 such that a sequence of manipulation signals are generated with each manipulation signal of the sequence being generated, at least in part, based on a respective modulator input signal parameter value. In an example embodiment, the respective modulator input signal parameter(s) comprises the voltage level of the electrical input signal, a frequency of the electrical input signal, and/or the like.

For example, the controller 30 and/or the computing entity 10 may cause a first input signal to be applied to the AOM and cause a manipulation source 60 to generate a manipulation signal that is conditioned and/or modulated (e.g., in amplitude/power, frequency, phase, duration, and/or a combination thereof) by the AOM. The characteristic (e.g., power, frequency, duration, and/or combination thereof) of the resulting manipulation signal is measured and/or determined (e.g., using a photodetector and/or an array of photodetectors configured to generate an electrical signal indicative of the received optical power, frequency, and/or duration). The input signal parameter value(s) of the first input signal and the resulting measured manipulation signal characteristic (e.g., power, frequency, duration, and/or combination thereof) are recorded. The process is repeated a plurality of times for various input signal parameter values such that the parameter space of the input signal parameter values is appropriately sampled. For example, the controller 30 and/or the computing entity 10 may generate and/or store a plurality of data points including input signal parameter value(s) and respective measured manipulation signal characteristic (e.g., power, frequency, duration, and/or combination thereof).

At step/operation 704, a function approximation of the measured relationship between manipulation signal characteristic (e.g., power, frequency, duration, and/or combination thereof) and the input signal parameter value(s) is determined. For example, the controller 30 and/or the computing entity 10 may process and/or analyze the data points generated at step/operation 702 to determine a function approximation of the data points. In an example embodiment, the function approximation corresponds to the manipulation signal power and has the functional form $P(v)=A_0 \sin^2[2\pi A_1 A_2(1-e^{-v/A_2})]$, where v is the input signal parameter value, $A_0$ is scaling constant that is determined based on fitting the function $P(v)$ to the data points, $A_1$ is period scaling constant that is determined based on fitting the function $P(v)$ to the data points, and $A_2$ is a damping constant that is determined based on fitting the function $P(v)$ to the data points. In various embodiments, the function approximation is invertible. Various function approximation formats may be used as appropriate for the manipulation signal characteristic and the observations gathered at step/operation 702.

In various embodiments, a first functional fitting is determined for positive arbitrary angle rotations and a second functional fitting is determined for negative arbitrary angle rotations. For example, the beat note frequency wp characterizing the interference of the third manipulation signal 510 and the fourth manipulation signal 520 satisfies $\omega_b=\omega_0\pm\omega_{z,2}\pm\delta$, wherein $\omega_{z,2}$ is the axial out-of-phase mode of the third and/or fourth manipulation signal 510, 520 and $2\pi/\delta \approx t_{gate}=35$ µs, where $t_{gate}$ is the duration that the gate is performed (e.g., the amount of time that the third and fourth manipulation signals 510, 520 are incident on the first and second atomic objects to perform the gate). In various embodiments, $\omega_b=2\pi v_s$, $v_s$ is the frequency separation between the third and fourth manipulation signals 510, 520. In various embodiments, the two-qubit rotation $U_{ZZ}(-\theta)$ by executing the two-qubit rotation $U_{ZZ}(\theta)$, but using $-\delta$.

At some later time, the controller 30 determines that an arbitrary angle two-qubit gate is to be performed on a first qubit embodied by a first atomic object and a second qubit embodied as a second atomic object. At step/operation 706, responsive to determining that an arbitrary angle two-qubit gate is to be performed, a manipulation signal characteristic (e.g., power, frequency, duration, and/or combination thereof) corresponding to the arbitrary angle is determined. For example, the controller 30 may determine a manipulation signal characteristic (e.g., power, frequency, duration, and/or combination thereof) required for performing the arbitrary angle two-qubit gate.

At step/operation 708, an appropriate modulator input signal parameter value is determined. For example, the appropriate modulator input signal parameter value is determined based at least in part on the determined manipulation signal characteristic (e.g., power, frequency, duration, and/or combination thereof) corresponding to the arbitrary angle and the function approximation of the relationship between the manipulation signal characteristic (e.g., power, frequency, duration, and/or combination thereof) and the modulator input signal parameter value (and/or the inverse of the function approximation). For example, the controller 30 determines an appropriate modulator input signal parameter value based on the function approximation (and/or its inverse) and the determined manipulation signal characteristic (e.g., power, frequency, duration, and/or combination thereof) corresponding to the arbitrary angle. In an example embodiment, a resultant AC stark shift for the first atomic object and/or the second atomic object (e.g., induced by the performance of the arbitrary angle two-qubit gate) is also determined.

At step/operation 710, third and fourth manipulation signals 510, 520 are generated that have respective characteristics (e.g., power, frequency, duration, and/or combination thereof) corresponding to the arbitrary angle. For example, the controller 30 causes the manipulation sources 60 to generate and provide the third manipulation signal and the fourth manipulation signal for performing the arbitrary angle two-qubit gate. The third manipulation signal 510 and the fourth manipulation signal 520 have respective power, frequency, duration, and/or combination thereof that correspond to the arbitrary angle and are generated based at least in part by applying an electrical input signal to one or more AOMs that is in accordance with the determined appropriate modulator input signal parameter value. The third and fourth manipulation signals 510, 520 are provided such that they are incident on the first atomic object and the second atomic object to perform the arbitrary angle two-qubit gate.

VII. EXAMPLE PERFORMANCE OF AN INDIVIDUAL SINGLE-QUBIT GATE USING GLOBAL SINGLE-QUBIT AND/OR TWO-QUBIT GATE PRIMITIVES

Various embodiments relate to the performance of an individual single-qubit gate. Various embodiments relate to the performance of an individual single-qubit gate that includes at least one two-qubit gate primitive and/or at least one global single-qubit gate. As used herein, an individual single-qubit gate is a gate that affects that state of only one qubit (beyond a possible phase shift). For example, the individual single-qubit gate may be generated through a combination of global single-qubit gate primitives and two-qubit gate primitives that are performed on two qubits. The result of performing the combination of the global single-qubit gate primitives and two-qubit gate primitives on the two qubits results in the state of first qubit of the two qubits being updated and/or modified and the state of a second qubit of the two qubits not being updated and/or modified beyond a possible change in phase (e.g., due to AC Stark shift and/or the like).

In various embodiments, the individual single-qubit gate is a general gate. In various embodiments, the individual single-qubit gate is a fixed angle gate. For example, the rotation angle is selected from a set of possible rotation angles (e.g., the set of $-\pi$, $-\pi/2$, $\pi/2$, and $\pi$ as one non-limiting example).

Figure 8:
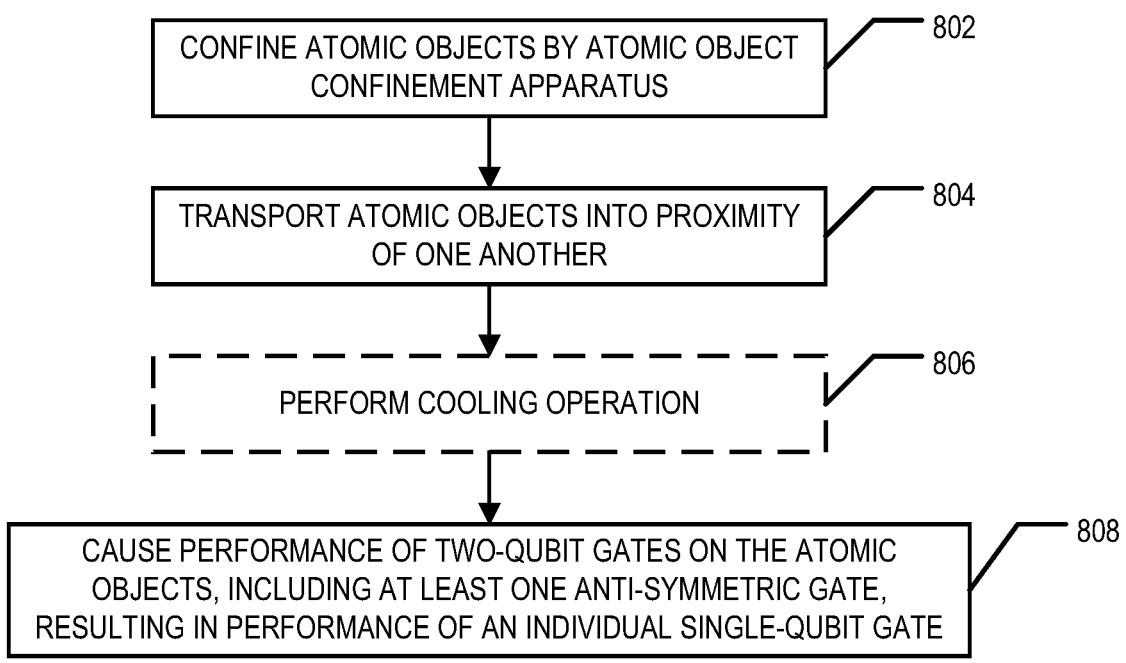
FIG. 8 is a flowchart illustrating processes, procedures, and/or operations for performing an individual single-qubit gate using global single-qubit and/or two-qubit gate primitives, according to an example embodiment.

FIG. 8 provides a flowchart illustrating various processes, procedures, operations, and/or the like for performing an individual single-qubit gate using global single-qubit gate and/or two-qubit gate primitives. Starting at step/operation 802, two or more atomic objects are confined by an atomic object confinement apparatus 70. For example, the controller 30 of a quantum computer may operate and/or cause operation of one or more voltage sources 50 to cause a confinement potential to be generated by the RF rail electrodes 72 and/or sequences of TT electrodes 74 to confine two or more atomic objects by the atomic object confinement apparatus 70.

The controller 30 may cause the quantum processor to begin performance and/or execution of a quantum circuit. For example, the controller 30 may control the operation of the voltage sources 50 to transport various atomic objects confined by the atomic object confinement apparatus 70 to particular positions within the atomic object confinement apparatus, control the operation of the manipulation sources 60 to cause one or more manipulation signals to be incident on the various atomic objects at the particular positions to cause one or more operations and/or functions of the quantum processor to be performed (e.g., single-qubit gates, two-qubit gates, qubit initialization (e.g., causing an atomic object to be initialized into a quantum state within the qubit space), reading of a qubit, and/or the like). At some point during the performance and/or execution of the quantum circuit a first qubit embodied by a first atomic object is to have an individual single-qubit gate performed thereon.

At step/operation 804, the first atomic object and the second atomic object are transported to respective locations within the atomic object confinement apparatus 70 that are proximate one another. In an example embodiment, the first atomic object and/or the second atomic object are transported such that the first atomic object and second atomic object are adjacent and/or neighboring one another (e.g., there are no other atomic objects disposed between the first atomic object and the second atomic object). For example, the controller 30 operates and/or causes operation of the voltage sources 50 such that controlling voltage signals are provided to the sequences of TT electrodes 74 that cause the first atomic object to move from a respective previous location to a first location and/or that cause the second atomic object to move from a respective previous location to a second location. The first location and the second location are proximate one another. For example, the quantum circuit may indicate that the first qubit and the second qubit are to be interacted with one another (e.g., a two-qubit gate is to be performed on the first qubit and the second qubit) prior to the performance of the individual single-qubit gate and/or after the performance of the single-qubit gate.

During the transportation of the first atomic object to the first location and/or the second atomic object to the second location, heating of the atomic objects may occur. At step/operation 806, a cooling operation may be performed to cool the first atomic object and/or the second atomic object. In an example embodiment, the cooling operation is a sympathetic cooling operation. For example, the controller 30 may cause one or more manipulation sources 60 to provide manipulation signals incident on sympathetic cooling atomic object(s) located near enough to a respective one of the first and/or second atomic objects such that the sympathetic cooling atomic object(s) are usable to extract heat from the first and/or second atomic objects.

At step 808, an individual single-qubit gate is performed on the first qubit by performing a sequence of gate primitives on the first qubit and the second qubit. In an example embodiment, the sequence of gate primitives consists only of global single-qubit gates and two-qubit gates. For example, the sequence of gate primitives that has the combined effect of an individual single-qubit gate does not include any gate primitives that are individually addressed gates (e.g., gates that are performed on only one qubit).

Figure 9:
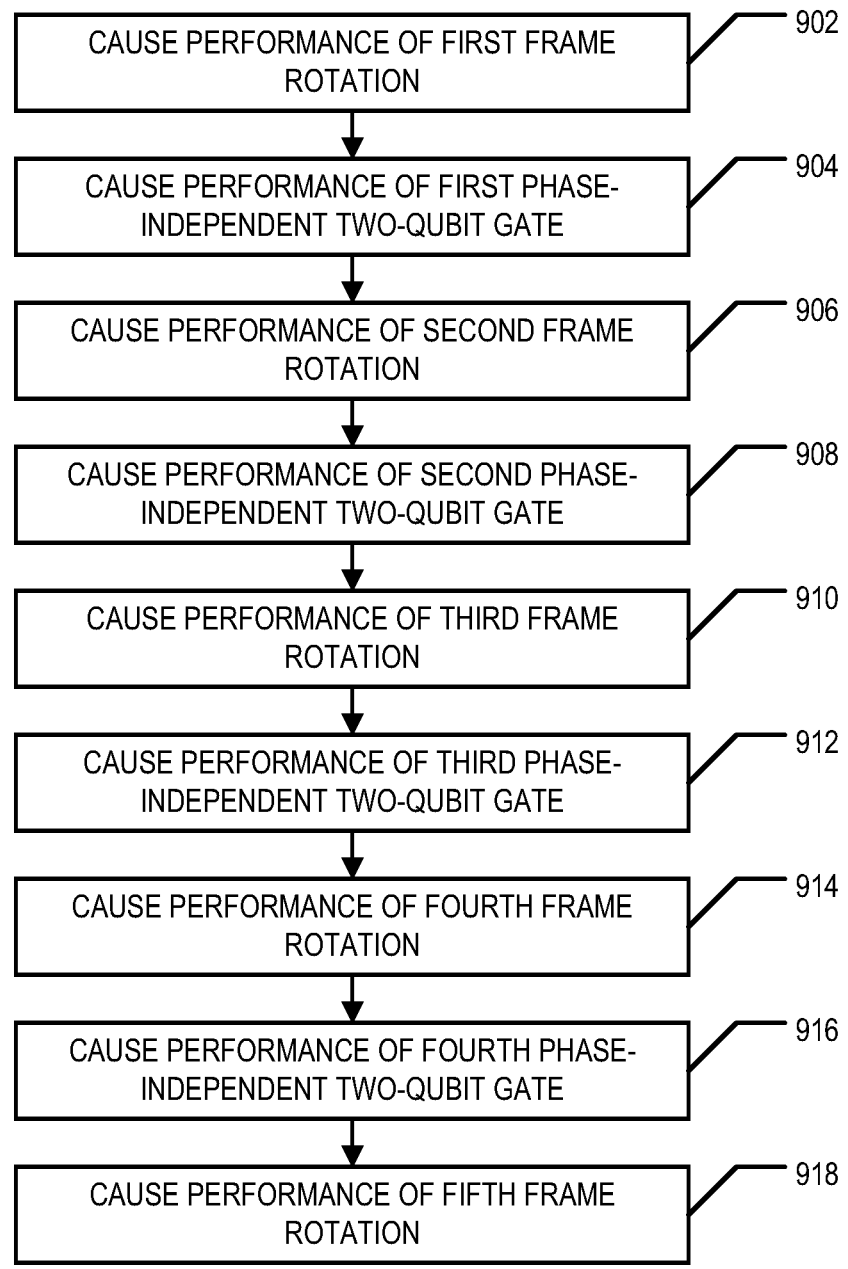
FIG. 9 is a flowchart illustrating processes, procedures, and/or operations for performing an individual single-qubit gate using global single-qubit gates and two-qubit gates, according to an example embodiment.

In an example embodiment, the performed sequence of gate primitives that has the effect of performing an individual single-qubit gate comprises one or more anti-symmetric $$iSWAP\left(\theta, \frac{\pi}{2}\right)$$

and/or sqrt(iSWAP) two-qubit gates. For example, the performed sequence of gate primitives that has the effect of performing an individual single-qubit gate comprises one or more pairs of anti-symmetric two-qubit $$iSWAP\left(\theta, \frac{\pi}{2}\right)$$

and/or sqrt(iSWAP) gates. For example, the performed sequence of gate primitives may include one or more instances of the anti-symmetric gate $$U_i(\theta, \pi/2) = \exp\left[-i\frac{\theta}{2}(XY - YX)\right],$$

which requires that the first atomic object and the second atomic object be separated by a separation distance $\Delta x$ that corresponds to a relative phase difference of $\pi/2$ in the standing wave generated by the third manipulation signal and the fourth manipulation signal at the first and second locations. In various embodiments, the performed sequence of gate primitives may include one or more instances of an arbitrary angle version of the anti-symmetric gate $U_i$ FIG. 9 provides a flowchart illustrating various processes, procedures, operations, and/or the like that may be performed to perform the sequence of gate primitives (that consists of global single-qubit gates and two-qubit gates) to cause the performance of an individual single-qubit gate. For example, the steps/operations illustrated in FIG. 9 may be performed (e.g., by the controller 30) as part of step/operation 808.

A non-limiting example individual qubit gate that is performed by the performance of a sequence of gate primitives that consists (only) of global single-qubit gates and two-qubit gates (including one or more anti-symmetric two-qubit gates) is an arbitrary angle Y rotation gate such as $\exp[i(\theta_y-\pi/2)Y]\otimes \mathbb{1}=U_G(\pi,\pi)U_i(\pi/2,\pi/2)U_G(\theta_y,\pi)U_{ZZ}(\pi/2)$ $U_G(\pi/2,\pi)U_i(\pi/2,\pi/2)U_G(\pi/2,\pi/2)U_{ZZ}(\pi/2)U_G(\pi-\theta_y,\pi/2)$, where $\mathbb{1}$ is an identity operation. In particular, the arbitrary angle Y rotation gate is an individual single-qubit gate that is performed on a first qubit and a second qubit and provides the effect of performing an arbitrary angle Y rotation on a first qubit and performing an identity operation on a second qubit (e.g., the quantum state of the second qubit is not updated or modified beyond possibly a small phase shift due to induced AC stark shift and/or the like). In various embodiments, the individual single-qubit arbitrary angle Y rotation gate, the global single-qubit gates, and at least one of the rotated phase-independent MS gate $U_{ZZ}$ or the phase-independent antisymmetric gate $U_i$ provide a controllable gate set (meaning the primitives of the gate set can be used build any arbitrary gate in $SU(2^m)$). In various embodiments, the gate set can be used to build any arbitrary gate in SU(4) using a maximum of six arbitrary angle two-qubit (e.g., two-qubit) gates.

In various embodiments, when using individual single-qubit gates that are performed by performing a sequence of global single-qubit gates and two-qubit gates, rather than individual single-qubit gates that are addressed to a particular qubit (by moving all the other qubits out or the proximity of the particular qubit) the phases of each qubit are tracked (e.g., in a respective qubit record (e.g., stored in memory 1010) and/or through the use of a software gate) and compiled into various SU(4) gates as the various SU(4) gates are applied to the qubits. In various embodiments, this tracking of the qubit phases and compilation of the SU(4) gates to account for the qubit phases requires no additional hardware as addressed individual single-qubit gates also require qubit phase tracking.

FIG. 9 illustrates processes, procedures, operations, and/or the like for performing the individual single-qubit gate example of the arbitrary angle Y rotation gate. Starting at step/operation 902, a first frame rotation is performed. For example, a first global single-qubit gate $U_G(\pi-\theta_y,\pi/2)$ is performed. For example, the controller 30 may cause one or more manipulation sources 60 to generate and provide respective first instances of a first manipulation signal 410 and a second manipulation signal 420 such that the respective first instances of the first manipulation signal 410 and the second manipulation signal 420 are incident on both the first atomic object and the second atomic object. The power present in the respective first instances of the first manipulation signal 410 and the second manipulation signal 420 and the length of time that the respective first instances of the first manipulation signal 410 and the second manipulation signal 420 are incident on (e.g., interacting with) the first atomic object and the second atomic object is configured to cause both the first atomic object and the second atomic object to undergo a $\Delta\theta$ rotation of $\pi-\theta_y$. For example, the polar angle $\theta$ of the respective qubit vectors $r_Q$ of the first qubit (embodied by the first atomic object) and the second qubit (embodied by the second atomic object) are modified (e.g., changed in value) by $\pi-\theta_y$. A phase difference between the respective first instance of the first manipulation signal 410 and the second manipulation signal 420 is configured to cause the azimuthal angle $\varphi$ of the respective qubit vectors $r_Q$ of the first qubit (embodied by the first atomic object) and the second qubit (embodied by the second atomic object) are modified (e.g., changed in value) by $\pi/2$.

At step/operation 904, a first phase-independent two-qubit gate primitive is performed. In the illustrated embodiment, a first phase-independent anti-symmetric two-qubit gate $U_I(\pi/2,\pi/2)$ is performed. For example, the controller 30 may cause one or more manipulation sources 60 to generate and provide respective first instances of a third manipulation signal 510 and a fourth manipulation signal 520 such that the respective first instances of the third manipulation signal 510 and the fourth manipulation signal 520 are incident on both the first atomic object and the second atomic object to cause the first anti-symmetric gate to be performed.

At step/operation 906, a second frame rotation is performed. For example, a second global single-qubit gate $U_G(\pi/2,\pi)$ is performed. For example, the controller 30 may cause one or more manipulation sources 60 to generate and provide respective second instances of a first manipulation signal 410 and a second manipulation signal 420 such that the respective second instances of the first manipulation signal 410 and the second manipulation signal 420 are incident on both the first atomic object and the second atomic object. The power present in the respective second instances of the first manipulation signal 410 and the second manipulation signal 420 and the length of time that the respective second instances of the first manipulation signal 410 and the second manipulation signal 420 are incident on (e.g., interacting with) the first atomic object and the second atomic object is configured to cause both the first atomic object and the second atomic object to undergo a $\Delta\theta$ rotation of $\pi/2$. For example, the polar angle $\theta$ of the respective qubit vectors $r_Q$ of the first qubit (embodied by the first atomic object) and the second qubit (embodied by the second atomic object) are modified (e.g., changed in value) by $\pi/2$. A phase difference between the respective second instance of the first manipulation signal 410 and the second manipulation signal 420 is configured to cause the azimuthal angle $\varphi$ of the respective qubit vectors $r_Q$ of the first qubit (embodied by the first atomic object) and the second qubit (embodied by the second atomic object) are modified (e.g., changed in value) by $\pi$.

At step/operation 908, a second phase-independent two-qubit gate primitive is performed. In an example embodiment, the second phase-independent two-qubit gate primitive is a phase-independent rotated MS gate $U_{ZZ}(\pi/2)$. For example, the controller 30 may cause one or more manipulation sources 60 to generate and provide respective second instances of a third manipulation signal 510 and a fourth manipulation signal 520 such that the respective second instances of the third manipulation signal 510 and the fourth manipulation signal 520 are incident on both the first atomic object and the second atomic object. The power present in the respective second instances of the third manipulation signal 510 and the fourth manipulation signal 520, the respective frequencies of the respective second instances of the third manipulation signal 510 and the fourth manipulation signal 520, and the duration that the respective second instances of the third manipulation signal 510 and the fourth manipulation signal 520 are incident on (e.g., interacting with) the first atomic object and the second atomic object is configured to cause an interaction between the first atomic object and the second atomic object characterized by rotation angle $\pi/2$.

At step/operation 910, a third frame rotation is performed. For example, a third global single-qubit gate $U_G(\theta_y,\pi)$ is performed. For example, the controller 30 may cause one or more manipulation sources 60 to generate and provide respective third instances of a first manipulation signal 410 and a second manipulation signal 420 such that the respective third instances of the first manipulation signal 410 and the second manipulation signal 420 are incident on both the first atomic object and the second atomic object. The power present in the respective third instances of the first manipulation signal 410 and the second manipulation signal 420 and the length of time that the respective fourth instances of the first manipulation signal 410 and the second manipulation signal 420 are incident on (e.g., interacting with) the first atomic object and the second atomic object is configured to cause both the first atomic object and the second atomic object to undergo a $\Delta\theta$ rotation of $\theta_y$. For example, the polar angle $\theta$ of the respective qubit vectors $r_Q$ of the first qubit (embodied by the first atomic object) and the second qubit (embodied by the second atomic object) are modified (e.g., changed in value) by $\theta_y$. A phase difference between the respective fourth instance of the first manipulation signal 410 and the second manipulation signal 420 is configured to cause the azimuthal angle $\varphi$ of the respective qubit vectors $r_Q$ of the first qubit (embodied by the first atomic object) and the second qubit (embodied by the second atomic object) are modified (e.g., changed in value) by $\pi$.

At step/operation 912, a third phase-independent two-qubit gate primitive is performed. In an example embodiment, the third phase-independent two-qubit gate primitive is a second phase-independent anti-symmetric two-qubit gate $U_I(\pi/2,\pi/2)$. For example, the controller 30 may cause one or more manipulation sources 60 to generate and provide respective third instances of a third manipulation signal 510 and a fourth manipulation signal 520 such that the respective third instances of the third manipulation signal 510 and the fourth manipulation signal 520 are incident on both the first atomic object and the second atomic object to cause the second anti-symmetric gate to be performed.

At step/operation 914, a fourth frame rotation is performed. For example, a fourth global single-qubit gate $U_G(\pi/2,\pi/2)$ is performed. For example, the controller 30 may cause one or more manipulation sources 60 to generate and provide respective fourth instances of a first manipulation signal 410 and a second manipulation signal 420 such that the respective fourth instances of the first manipulation signal 410 and the second manipulation signal 420 are incident on both the first atomic object and the second atomic object. The power present in the respective fourth instances of the first manipulation signal 410 and the second manipulation signal 420 and the length of time that the respective second instances of the first manipulation signal 410 and the second manipulation signal 420 are incident on (e.g., interacting with) the first atomic object and the second atomic object is configured to cause both the first atomic object and the second atomic object to undergo a $\Delta\theta$ rotation of $\pi/2$. For example, the polar angle $\theta$ of the respective qubit vectors $r_Q$ of the first qubit (embodied by the first atomic object) and the second qubit (embodied by the second atomic object) are modified (e.g., changed in value) by $\pi/2$. A phase difference between the respective fourth instances of the first manipulation signal 410 and the second manipulation signal 420 is configured to cause the azimuthal angle $\varphi$ of the respective qubit vectors $r_Q$ of the first qubit (embodied by the first atomic object) and the second qubit (embodied by the second atomic object) are modified (e.g., changed in value) by $\pi/2$.

At step/operation 916, a fourth phase-independent two-qubit gate primitive is performed. In an example embodiment, the second phase-independent two-qubit gate primitive is a phase-independent rotated MS gate $U_{ZZ}(\pi/2)$. For example, the controller 30 may cause one or more manipulation sources 60 to generate and provide respective fourth instances of a third manipulation signal 510 and a fourth manipulation signal 520 such that the respective fourth instances of the third manipulation signal 510 and the fourth manipulation signal 520 are incident on both the first atomic object and the second atomic object. The power present in the respective fourth instances of the third manipulation signal 510 and the fourth manipulation signal 520, the respective frequencies of the fourth instances of the third manipulation signal 510 and the fourth manipulation signal 520, and/or the duration that the respective fourth instances of the third manipulation signal 510 and the fourth manipulation signal 520 are incident on (e.g., interacting with) the first atomic object and the second atomic object is configured to cause an interaction between the first atomic object and the second atomic object characterized by rotation angle $\pi/2$.

At step/operation 918, a fifth frame rotation is performed. For example, a third global single-qubit gate $U_G(\pi,\pi)$ is performed. For example, the controller 30 may cause one or more manipulation sources 60 to generate and provide respective fifth instances of a first manipulation signal 410 and a second manipulation signal 420 such that the respective fifth instances of the first manipulation signal 410 and the second manipulation signal 420 are incident on both the first atomic object and the second atomic object. The power present in the respective fifth instances of the first manipulation signal 410 and the second manipulation signal 420 and the length of time that the respective fifth instances of the first manipulation signal 410 and the second manipulation signal 420 are incident on (e.g., interacting with) the first atomic object and the second atomic object is configured to cause both the first atomic object and the second atomic object to undergo a $\Delta\theta$ rotation of $\pi$. For example, the polar angle $\theta$ of the respective qubit vectors $r_Q$ of the first qubit (embodied by the first atomic object) and the second qubit (embodied by the second atomic object) are modified (e.g., changed in value) by $\pi$. A phase difference between the respective fourth instance of the first manipulation signal 410 and the second manipulation signal 420 is configured to cause the azimuthal angle $\varphi$ of the respective qubit vectors $r_Q$ of the first qubit (embodied by the first atomic object) and the second qubit (embodied by the second atomic object) are modified (e.g., changed in value) by $\pi$.

The result of the performance of the example individual single-qubit gate that the first qubit has had an arbitrary angle Y rotation performed thereon and the second qubit has had an identity gate performed thereon.

VIII. TECHNICAL ADVANTAGES

An overarching technical problem in the field of quantum computing is reducing the errors accumulated during performance of a quantum circuit. Various embodiments provide technical solutions to this technical problem through the use of two-qubit arbitrary angle gates that use global single-qubit gates.

Various quantum circuits require the use of general (single-qubit, two-qubit, and/or multiple-qubit) gates. Variational algorithms (e.g., a variational quantum eigen-solver (VQE) and/or the like), QAOA, QFT, Hamiltonian simulation techniques, and volume tests are some examples of calculations that are beneficial to enact on a quantum computer and/or that have implementation that requires the use of a quantum computer and that include arbitrary angle gates. A conventional decomposition of a general two-qubit gate includes three fixed-angle two-qubit gates and three to five addressed single-qubit gates. Due to atomic object transporting required to perform the addressed single-qubit gates, a cooling operation is performed prior to each of the three fixed-angle two-qubit gates. Cooling operations are relatively slow compared to other functions and/or operations performed by the quantum computer, leading to memory errors and drift errors (e.g., manipulation source power, frequency, and/or phase drift, atomic object phase drift, and/or the like). Various embodiments reduce the number of cooling operations that need to be performed during performance of a general two-qubit gate by a factor of three. Thus, various embodiments significantly reduce the errors experienced when performing a general two-qubit gate due to the required multiple performances of cooling operations.

The conventional decomposition of a general two-qubit gate includes three fixed-angle two-qubit gates. The fixed angle is conventionally set at $\pi/2$ such that performance of the two-qubit arbitrary angle gate results in a total rotation angle of $3\pi/2$. In an example embodiment, over a sample of 10,000 arbitrary angle SU(4) gates, the inventors found the average total rotation angle to be approximately $3\pi/4$, or half of the total rotation angle of the conventional general two-qubit gate decomposition. Conventionally, MS gates are used as the two-qubit gates in the decomposition of the general two-qubit gate. However, many errors in the MS gate (e.g., amplitude error, detuning error, phase noise errors, spontaneous emission, and/or the like), increase monotonically with the total rotation angle. Therefore, by reducing the total rotation angle, various embodiments reduce the gate errors caused by performance of the general two-qubit gate.

As noted above, when using individually addressed single-qubit gate primitives, atomic objects need to be moved apart from one another to perform the individually addressed single-qubit gate and may then need to be transported to being proximate to one another again for a two-qubit gate to be performed. Each time the atomic objects are transporting to being proximate one another, a cooling operation must be performed to reduce heating errors. Thus, various embodiments provide an improvement to the field of quantum computing by providing global single-qubit gates and individual single-qubit gates (e.g., single-qubit gates that do not require addressing and/or that include at least one two-qubit gate such as an anti-symmetric gate).

Moreover, various embodiments provide solutions to technical problems relating to the manipulation signal power, frequency, duration, and/or combination thereof calibration and physical phase updating identified by the inventors during the inventive process.

Thus, various embodiments provide improvements to the field of quantum computing and QCCD-based quantum computing by providing arbitrary angle gates that include rotations about arbitrary angles and/or individual single-qubit gates that do not require addressing.

IX. EXEMPLARY CONTROLLER

In various embodiments, an atomic object confinement apparatus is incorporated into a quantum computer 110. In various embodiments, a quantum computer 110 further comprises a controller 30 configured to control various elements of the quantum computer 110. For example, the controller 30 may be configured to control the voltage sources 50, a cryogenic system and/or vacuum system controlling the temperature and pressure within the cryostat and/or vacuum chamber 40, manipulation sources 60, magnetic field generators 80, and/or other systems controlling the environmental conditions (e.g., temperature, humidity, pressure, and/or the like) within the cryostat and/or vacuum chamber 40 and/or configured to manipulate and/or cause a controlled evolution of quantum states of one or more atomic objects within the atomic object confinement apparatus 70.

As shown in FIG. 10, in various embodiments, the controller 30 may comprise various controller elements including processing elements and/or devices 1005, memory 1010, driver controller elements 1015, a communication interface 1020, analog-digital converter elements 1025, and/or the like. For example, the processing elements and/or devices 1005 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element and/or device 1005 of the controller 30 comprises a clock and/or is in communication with a clock. For example, the processing element and/or device 1005 is configured to determine how to cause the quantum processor 115 to perform a quantum circuit (e.g., using parallel and/or simultaneous) operations and then control various aspects of the quantum computer (e.g., by providing instructions to respective driver controller elements 1015) to cause the quantum processor 115 to perform the quantum circuit. In various embodiments, performance of the quantum circuit includes performance of one or more arbitrary angle gates and/or one or more global gates.

For example, the memory 1010 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 1010 may store qubit records corresponding the qubits of quantum computer (e.g., in a qubit record data store, qubit record database, qubit record table, and/or the like), one or more functional representations of the manipulation signal power, frequency, duration, and/or combination thereof as a function of an input signal (e.g., input signal parameter value(s)) provided to a modulator configured to condition a respective manipulation signal, a calibration table, an executable queue, computer program code (e.g., in a one or more computer languages, specialized controller language(s), and/or the like), one or more libraries, one or more waveform series for forming controlling voltage signals for controlling the transportation of atomic objects along one dimensional trapping regions and through junctions connecting one dimensional trapping regions and associated meta data, and/or the like. In an example embodiment, a qubit record corresponding to a respective qubit tracks the phase of the respective qubit, any AC Stark shift imparted thereto, the result of any software gates to the phase of the qubit, and/or the like. In an example embodiment, execution of at least a portion of the computer program code stored in the memory 1010 (e.g., by a processing element and/or device 1005) causes the controller 30 to perform one or more steps, operations, processes, procedures and/or the like described herein for tracking the phase, location, and/or the like of an atomic object and/or multi-atomic object crystal within an atomic system and causing the adjustment of the phase of one or more manipulation sources and/or signal(s) generated thereby.

In various embodiments, the driver controller elements 1015 may include one or more drivers and/or controller elements each configured to control one or more drivers. In various embodiments, the driver controller elements 1015 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element and/or device 1005). In various embodiments, the driver controller elements 1015 may enable the controller 30 to operate a manipulation source 60, voltage sources 50, magnetic field generators 80, and/or the like. In various embodiments, the drivers may be laser drivers; vacuum component drivers; drivers for controlling the flow of current and/or voltage applied to TT electrodes, RF rail electrodes, RF bus electrodes, and/or other electrodes used for maintaining and/or controlling the magnetic field at various regions of the atomic object confinement apparatus 70, maintaining and/or controlling the trapping potential of the atomic object confinement apparatus 70, and/or causing transport of one or more atomic objects; cryogenic and/or vacuum system component drivers; and/or the like. For example, the drivers may control and/or comprise TT and/or RF voltage drivers and/or voltage sources 50 that provide voltages and/or electrical signals (e.g., oscillating voltage signals and/or controlling voltage signals) to the TT electrodes and/or RF rail electrodes.

In various embodiments, the controller 30 comprises means for communicating and/or receiving signals from one or more optical receiver components such as photodetectors, cameras, MEMs cameras, CCD cameras, photodiodes, photomultiplier tubes, and/or the like of an optics collection system configured to capture, detect, measure, and/or the like optical signals generated by atomic objects trapped and/or confined by the atomic object confinement apparatus 70. For example, the controller 30 may comprise one or more analog-digital converter elements 1025 configured to receive signals from one or more optical receiver components, calibration sensors, and/or the like.

In various embodiments, the controller 30 may comprise a communication interface 1020 for interfacing and/or communicating with a computing entity 10. For example, the controller 30 may comprise a communication interface 1020 for receiving executable instructions, command sets, and/or the like from the computing entity 10 and providing output received from the quantum computer 110 (e.g., from an optical collection system) and/or the result of a processing the output to the computing entity 10. In various embodiments, the computing entity 10 and the controller 30 may communicate via a direct wired and/or wireless connection and/or one or more wired and/or wireless networks 20.

X. EXEMPLARY COMPUTING ENTITY

FIG. 11 provides an illustrative schematic representative of an example computing entity 10 that can be used in conjunction with embodiments of the present invention. In various embodiments, a computing entity 10 is configured to allow a user to provide input to the quantum computer 110 (e.g., via a user interface of the computing entity 10) and receive, display, analyze, and/or the like output from the quantum computer 110.

As shown in FIG. 11, a computing entity 10 can include an antenna 1112, a transmitter 1104 (e.g., radio), a receiver 1106 (e.g., radio), and a processing element 1108 that provides signals to and receives signals from the transmitter 1104 and receiver 1106, respectively. The signals provided to and received from the transmitter 1104 and the receiver 1106, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 130 may use such protocols and standards to communicate using Border Gateway Protocol (BGP), Dynamic Host Configuration Protocol (DHCP), Domain Name System (DNS), File Transfer Protocol (FTP), HyperText Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 1116 and/or speaker/speaker driver coupled to a processing element 1108 and a touch screen, keyboard, mouse, and/or microphone coupled to a processing element 1108). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 1118 (hard or soft), a touch display, voice/speech or motion interfaces, scanners, readers, or other input device. In embodiments including a keypad 1118, the keypad 1118 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 1122 and/or non-volatile storage or memory 1124, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

XI. CONCLUSION

Many modifications and other embodiments of the invention set forth herein will come to mind to one skilled in the That which is claimed:

1. A method for performing a general two-qubit gate using a QCCD-based quantum processor, the method comprising:
   providing a first atomic object and a second atomic object confined by an element of the QCCD-based quantum processor
   causing, by a controller configured to control various operations of the QCCD-based quantum processor, performance of a first frame rotation of the first atomic object and performance of the first frame rotation of the second atomic object;
   causing, by the controller, transportation of the first atomic object and the second atomic object such that the second atomic object is physically located proximate the first atomic object;
   causing performance of a first phase-independent two-qubit gate corresponding to a rotation of a first arbitrary angle on the first atomic object and the second atomic object;
   causing performance of a second frame rotation of the first atomic object and the second frame rotation of the second atomic object;
   causing performance of a second arbitrary angle phase-independent two-qubit gate corresponding to a rotation of a second arbitrary angle to the first atomic object and the second atomic object;
   causing performance of a third frame rotation of the first atomic object and the third frame rotation of the second atomic object; and
   causing performance of a third phase-independent two-qubit gate corresponding to a third arbitrary angle to the first atomic object and the second atomic object.

2. The method of claim 1, wherein each of the second frame rotation and the third frame rotation comprise a respective one or more global single-qubit gates, each global single qubit gate acts on the first atomic object and the second atomic object.

3. The method of claim 1, wherein the second frame rotation and the third frame rotation are each performed by a respective pair of single-qubit gate manipulation signals being incident on both the first atomic object and the second atomic object.

4. The method of claim 3, wherein the pair of single-qubit gate manipulation signals comprises a first manipulation signal and a second manipulation signal, the first manipulation signal and the second manipulation signal (a) co-propagate and (b) have a frequency difference corresponding to an energy difference between a first state of a qubit space and a second state of the qubit space.

5. The method of claim 1, wherein the first, second, and third phase-independent two-qubit gates are each performed by a respective pair of two-qubit gate manipulation signals being incident on both the first atomic object and the second atomic object.

6. The method of claim 5, wherein the pair of two-qubit gate manipulation signals comprises a third manipulation signal and a fourth manipulation signal, the third manipulation signal and the fourth manipulation signal (a) propagate at a relative angle of 90 degrees, (b) are linearly polarized, and (c) are linearly polarized in perpendicular directions.

7. The method of claim 6, wherein at least one characteristic of at least one of the third manipulation signal or the fourth manipulation signal is controlled based on a functional representation of a manipulation signal characteristic as a function of an input signal to a modulator configured to condition a respective one of the third manipulation signal or the fourth manipulation signal, wherein the at least one characteristic is at least one of power level, frequency, or duration.

8. The method of claim 1, wherein a phase of at least one of (a) the first atomic object or (b) the second atomic object is physically updated prior to performance of the first frame rotation or as part of the first frame rotation.

9. The method of claim 1, wherein a cooling step is performed prior to performing the first phase-independent two-qubit gate.

10. The method of claim 9, wherein after performing the cooling step prior to performing the first phase-independent two-qubit gate, no further cooling is performed on the first atomic object and the second atomic object until after performance of the third phase-independent two-qubit gate.

11. A quantum computer comprising:
   an atomic object confinement apparatus configured to confine two or more atomic objects;
   one or more manipulation sources; and
   a controller configured to control the one or more manipulation sources and the atomic object confinement apparatus to cause the one or more manipulation sources to generate and provide two or more pairs of manipulation signals such that the two or more pairs of manipulation signals are each incident on the two or more atomic objects, wherein at least one of the two or more pairs of manipulation signals is configured to cause performance of an anti-symmetric two-qubit gate on the two or more atomic objects and wherein a combined effect of the two or more pairs of manipulation signals being incident on the two or more atomic objects is performance of an individual single-qubit gate.

12. The quantum computer of claim 11, wherein the two or more atomic objects comprise a first atomic object and a second atomic object and wherein the first atomic object and the second atomic object are separated by a separation distance corresponding to a selected phase difference of at least one of the two or more pairs of manipulation signals.

13. The quantum computer of claim 11, wherein the controller is further configured to track respective AC stark shifts imparted to each of the two or more atomic objects as a result of the two or more pairs of manipulation signals being incident on the two or more atomic objects.

14. The quantum computer of claim 11, wherein the single qubit gate is part of a controllable gate set that does not require single-qubit addressing.

15. A quantum computer comprising:
   an atomic object confinement apparatus configured to confine two or more atomic objects;
   one or more manipulation sources; and
   a controller configured to control the one or more manipulation sources and the atomic object confinement apparatus to cause:
      a first atomic object to be confined by the atomic object confinement apparatus and a second atomic object to be confined by the atomic object confinement apparatus cause a respective first frame rotation pair of manipulation signals to be incident on each of the first atomic object and the second atomic object to cause performance of a first frame rotation of the first atomic object and performance of the first frame rotation of the second atomic object;

cause transport of at least one of the first atomic object or the second atomic object such that the first atomic object is proximate the second atomic object;

cause a first two-qubit gate pair of manipulation signals to be incident on the first atomic object and the second atomic object to cause performance of a first phase-independent two-qubit gate corresponding to a rotation of a first arbitrary angle on the first atomic object and the second atomic object;

cause a second frame rotation pair of manipulation signals to be incident on the first atomic object and the second atomic object to cause performance of a second frame rotation of the first atomic object and the second frame rotation of the second atomic object;

cause a second two-qubit gate pair of manipulation signals to be incident on the first atomic object and the second atomic object to cause performance of a second phase-independent two-qubit gate corresponding to a rotation of a second arbitrary angle to the first atomic object and the second atomic object;

cause a third frame rotation pair of manipulation signals to be incident on the first atomic object and the second atomic object to cause performance of a third frame rotation of the first atomic object and the third frame rotation of the second atomic object; and cause a third two-qubit gate pair of manipulation signals to be incident on the first atomic object and the second atomic object to cause performance of a third phase-independent two-qubit gate corresponding to a rotation of a third arbitrary angle to the first atomic object and the second atomic object.

16. The quantum computer of claim 15, wherein the first atomic object and the second atomic object are respective qubits of the quantum computer.

17. The quantum computer of claim 15, wherein the controller is further configured to determine a characteristic of at least one manipulation signal of at least one of a first multiple gate pair, second multiple gate pair, third multiple gate pair, or fourth multiple gate pair is determined based on a functional representation of a manipulation signal characteristic as a function of an input signal to a modulator configured to condition that the at least one manipulation signal, wherein the at least one characteristic is at least one of power level, frequency, or duration.

18. The quantum computer of claim 15, wherein the controller is further configured to control the atomic object confinement apparatus to maintain the first atomic object at a first location and maintain the second atomic object at a second location at least for a time period beginning when the first frame rotation pair of manipulation signals is incident on the first atomic object and the second atomic object and ending when the third two-qubit gate pair of manipulation signals is incident on the first atomic object and the second atomic object.

19. The quantum computer of claim 15, wherein the controller is further configured to cause performance of a cooling step prior to causing the first two-qubit gate pair of manipulation signals to be incident on the first atomic object and the second atomic object.

20. The quantum computer of claim 19, wherein after performing the cooling step prior to causing the first two-qubit gate pair of manipulation signals to be incident on the first atomic object and the second atomic object, no further cooling is performed on the first atomic object and the second atomic object until after performance of the third phase-independent two-qubit gate.

* * * * *